(12) United States Patent
Hosoda

(10) Patent No.: US 8,194,289 B2
(45) Date of Patent: *Jun. 5, 2012

(54) IMAGE PROCESSING DEVICE, METHOD AND PROGRAM PRODUCT PROCESSING BARCODES WITH LINK INFORMATION CORRESPONDING TO OTHER BARCODES

(75) Inventor: Yuichi Hosoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/292,372

(22) Filed: Nov. 9, 2011

(65) Prior Publication Data

US 2012/0057742 A1 Mar. 8, 2012

Related U.S. Application Data

(63) Continuation of application No. 12/360,174, filed on Jan. 27, 2009, now Pat. No. 8,081,348.

(30) Foreign Application Priority Data

Jan. 28, 2008 (JP) ................. 2008-016715

(51) Int. Cl.
*G06K 19/06* (2006.01)
*G06K 9/32* (2006.01)
*B41M 3/14* (2006.01)
(52) U.S. Cl. .................. 358/3.28; 358/1.14; 235/462.08
(58) Field of Classification Search .................. 358/1.9, 358/3.28, 1.13–1.18, 403, 464; 382/287, 382/291, 306; 235/462.01, 462.08, 462.09, 235/462.1, 462.11, 462.41, 485
See application file for complete search history.

(56) References Cited

U.S. PATENT DOCUMENTS

| 7,865,042 B2 | 1/2011 | Cattrone et al. |
| 2003/0179399 A1 | 9/2003 | Matsunoshita |
| 2007/0127055 A1 | 6/2007 | Kujirai et al. |

FOREIGN PATENT DOCUMENTS

| JP | 2003-205661 | 7/2003 |
| JP | 2003-280469 | 10/2003 |

*Primary Examiner* — Scott A Rogers
(74) *Attorney, Agent, or Firm* — Fitzpatrick, Cella, Harper & Scinto

(57) ABSTRACT

In a copy generation management on paper, the present invention aims to detect a falsification in embedded information and increase the capacity of embedded information while maintaining security. The image processing device embeds second additional information into document image data embedded with first additional information. The image processing device deletes a part where the first additional information is embedded in the document image data, and embeds the second additional information into the part of the first additional information thus deleted. The image processing device further embeds third information different from the first and second additional information at a position different from position at which the second additional information is embedded. Further, the embedding means embeds the third information at a position indicated by the second additional information.

10 Claims, 24 Drawing Sheets

| EMBEDDING AREA | EMBEDDED INFORMATION |
|---|---|
| BACKGROUND | COPY INHIBIT INFORMATION; TRACKING INFORMATION AT TIME OF FIRST PRINT; EMBEDDING POSITION INFORMATION OF A; |
| A | COPY HISTORY INFORMATION; EMBEDDING POSITION INFORMATION OF B; |
| B | COPY HISTORY INFORMATION; EMBEDDING POSITION INFORMATION OF C; |
| C | COPY HISTORY INFORMATION; END INFORMATION; |

FIG.15

| DATA ITEM | DATA CONTENTS |
|---|---|
| TOTAL DATA SIZE | T |
| USE SIZE | A |
| NUMBER OF MANAGED HISTORIES | N |
| HISTORY 1 — USER NAME | USER-A |
| HISTORY 1 — TIME | 2006/11/01 |
| HISTORY 1 — MACHINE NUMBER | 0123456789 |
| HISTORY 2 — USER NAME | USER-B |
| HISTORY 2 — TIME | 2006/11/02 |
| HISTORY 2 — MACHINE NUMBER | 0123456789 |
| ⁝ | ⁝ |
| HISTORY N — USER NAME | USER-N |
| HISTORY N — TIME | 2006/11/02 |
| HISTORY N — MACHINE NUMBER | 0123456789 |
| LINK INFORMATION | Pos(Xa,Xb,Ya,Yb) |

FIG.17

| EMBEDDING AREA | EMBEDDED INFORMATION |
|---|---|
| BACKGROUND | COPY INHIBIT INFORMATION; TRACKING INFORMATION AT TIME OF FIRST PRINT; EMBEDDING POSITION INFORMATION OF A; |
| A | EMBEDDING POSITION INFORMATION OF B; EMBEDDING POSITION INFORMATION OF C; EMBEDDING POSITION INFORMATION OF D; |
| B | COPY HISTORY INFORMATION; |
| C | COPY HISTORY INFORMATION; |
| D | COPY HISTORY INFORMATION; |

FIG.22

IMAGE PROCESSING DEVICE, METHOD AND PROGRAM PRODUCT PROCESSING BARCODES WITH LINK INFORMATION CORRESPONDING TO OTHER BARCODES

This application is a continuation of U.S. patent application Ser. No. 12/360,174, filed Jan. 27, 2009, and allowed on Oct. 7, 2011.

BACKGROUND OF THE INVENTION

1. Field of the Invention

The present invention relates to an image processing apparatus for controlling copy operation by embedding information for copy inhibition or information for tracing print-out operations, and by extracting the information thus embedded.

2. Description of the Related Art

With the development of IT technology in offices, there has been an increasing concern for security in recent years. For example, cases of leakage of corporate customer information have frequently occurred, and such threatening of personal privacy has become a great social problem.

To deal with such problems, measures for preventing information leakage to the outside of a firm have been taken in general, for example, by controlling an access right to digitized confidential information and by installing a monitoring device for a firewall. Moreover, there is a measure in which portable media such as a notebook computer or a USB memory are forbidden to be carried into and out of an office. In the case of digitized confidential information, corporate customer information can be protected by determining and implementing monitoring policies, as described above. However, when confidential information is printed on a paper medium with a printer, it is considered to be more difficult to check or forbid the carrying-out of the paper medium on which personal information is printed, than to restrict the carrying-out of digitized confidential information. This makes it difficult to maintain security.

To ensure security of printed material, there is a copy restriction technology (e.g., Japanese Patent Laid-open No. 2003-280469) in which information on copy permission or copy inhibition of a printed material under a particular condition is embedded in an original document in the form of a dot pattern or a bar code so that copy is restricted. Further, there is a tracking technology (e.g., Japanese Patent Laid-open No. 2003-205661) for tracking persons who make copies. In this technology, copy inhibit information and information indicating a place where copy history information is embedded are embedded into a digital watermark of a type embedded into the entire surface of a sheet of paper.

In the tracking technology of Japanese Patent Laid-open No. 2003-205661, in addition to a digital watermark, an editable bar code and image position information of the bar code are embedded into the digital watermark. At the time of copying, the image position of the bar code is identified from extracted digital watermark information, and it is determined whether the bar code is embedded at that position. In this technology, when the bar code is not embedded at that position, copying is prohibited as a fraudulent copy.

However, in the above-described conventional technologies, there is a problem that an embedding area of copy history information is fixed at the first print, and may eventually run out of its information capacity as copies are repeatedly made.

Meanwhile, as to the above-described problems, the shortage of the information capacity of the embedding area of copy history information can be avoided by adding an embedding area of copy history information at the time of copying. However, it is not possible to detect a falsification of the embedding area of copy history information without determining, for each copy, how the embedding area has been added. To manage copy generation information for paper copies, it is necessary to prevent copy history information from being falsified.

SUMMARY OF THE INVENTION

In a copy generation management technique using paper in particular, the present invention aims to enable falsification detection in which a falsification is determined as being made if pieces of embedded information fail to be extracted in order of copy generation, and also to increase the capacity of embedded information while maintaining security.

An aspect of an image processing device of the present invention is that the image processing device comprises: deleting means for deleting additional information from document image data in which the additional information is embedded, the additional information (called embedding-end information below) indicating the end of embedding additional information; and embedding means for embedding second information into an area where the embedding-end information is deleted by the deleting means, the second information (called additional-information presence information below) indicating the presence of other additional information newly added.

In accordance with the above aspect, the image processing device of the present invention is characterized in that the embedding means further embeds third information at a position different from a position where the additional-information presence information is embedded, the third information being different from the embedding-end information and the additional-information presence information.

In accordance with the above aspect, the image processing device of the present invention is characterized in that the embedding means embeds third information at a position indicated by the additional-information presence information, the third information being different from the embedding-end information and the additional-information presence information.

In accordance with the above aspect, the image processing device of the present invention is characterized in that the embedding-end information and the third information are information respectively indicating that areas where the embedding-end information and the third information are respectively embedded are areas where latest information is embedded.

In accordance with the above aspect, the image processing device of the present invention is characterized in that the document image data includes background embedded information, the background embedded information is information in which predetermined information is repeated; and not all of the background embedded information is deleted even when part of the background embedded information is deleted due to the embedding of information performed by the embedding means.

In accordance with the above aspect, the image processing device of the present invention is characterized in that the background embedded information includes positional information indicating a position for firstly embedding information including copy history information on copy history of an original document.

An aspect of an image processing method of the present invention comprises: an embedding step of embedding additional-information presence information into document image data in which embedding-end information is embedded. The image processing method characterized in that the embedding step includes: deleting the embedding-end information from the document image data; and embedding the additional-information presence information in an area where the embedding-end information is deleted.

In accordance with the above aspect, the image processing method is characterized in that, the embedding step includes embedding third information at a position different from a position where the additional-information presence information is embedded, the third information being different from the embedding-end information and the additional-information presence information.

In accordance with the above aspect, the image processing method is characterized in that, the embedding step includes embedding third information at a position indicated by the additional-information presence information, the third information being different from the embedding-end information and the additional-information presence information.

In accordance with the above aspect, the image processing method is characterized in that, the embedding-end information, and the third information is information indicating that an area in which either of the embedding-end information and the third information are embedded is the area in which latest information is embedded.

In accordance with the above aspect, the image processing method is characterized in that, the document image data includes background embedded information, the background embedded information being information in which predetermined information is repeated; and not all the background embedded information is deleted even when part of the background embedded information is deleted due to the embedding of information performed in the embedding step.

In accordance with the above aspect, the image processing method is characterized in that, the background embedded information includes positional information indicating a position for firstly embedding information including copy history information on copy history of an original document is first embedded.

The respective steps of the above image processing method may be configured as a program for causing a computer to perform the step, the program being provided to a computer of an image processing device or to an information processing system. By causing the computer to read this program, the image processing method is performed by the computer. Further, the computer may read this program via a computer readable storage medium storing the program.

An aspect of an image processing device of the present invention is that the image processing device includes: deleting means for deleting an image of an area in which additional-information presence information is not embedded and in which additional information different from the additional-information presence information is embedded; and embedding means for embedding additional-information presence information into the area in which the image is deleted by the deleting means.

An aspect of an image processing device of the present invention is that the image processing device includes: deleting means for deleting embedding-end information from document image data in which the embedding-end information is embedded; and embedding means for embedding additional-information presence information into an area in which the embedding-end information is deleted by the deleting means, the additional-information presence information being different from the embedding-end information.

In this specification, the image processing device is assumed to include a general purpose information processing device capable of performing processes related to the present invention, in addition to a dedicated image processing device and a dedicated image forming device.

In accordance with the present invention, even when there are plural areas each embedded with information, information for tracking embedded positions in sequence is embedded into each of the areas, whereby all the embedding areas can be identified. Thus, in a copy generation management using paper in particular, it is determined that a falsification has been made unless all embedded pieces of information (copy history information, in particular) are extracted in order of copy generation, and also capacity extension of embedded information is achieved, while maintaining security.

Further features of the present invention will become apparent from the following description of exemplary embodiments (with reference to the attached drawings).

BRIEF DESCRIPTION OF THE DRAWINGS

FIG. 15 is a table showing a relationship between embedding areas described in FIG. 14 and embedded information;

FIG. 17 is a table for explaining information which is embedded into an embedding area 502 described in FIG. 16;

FIG. 22 is a table showing a relationship between embedding areas described in FIG. 21 and embedded information;

DESCRIPTION OF THE EMBODIMENTS

Preferred embodiments of the present invention are described below with reference to the accompanying drawings. Constituent elements described in the embodiments are merely examples, and hence, the scope of the present invention is not limited thereto.

Embodiment 1

Figure 1:
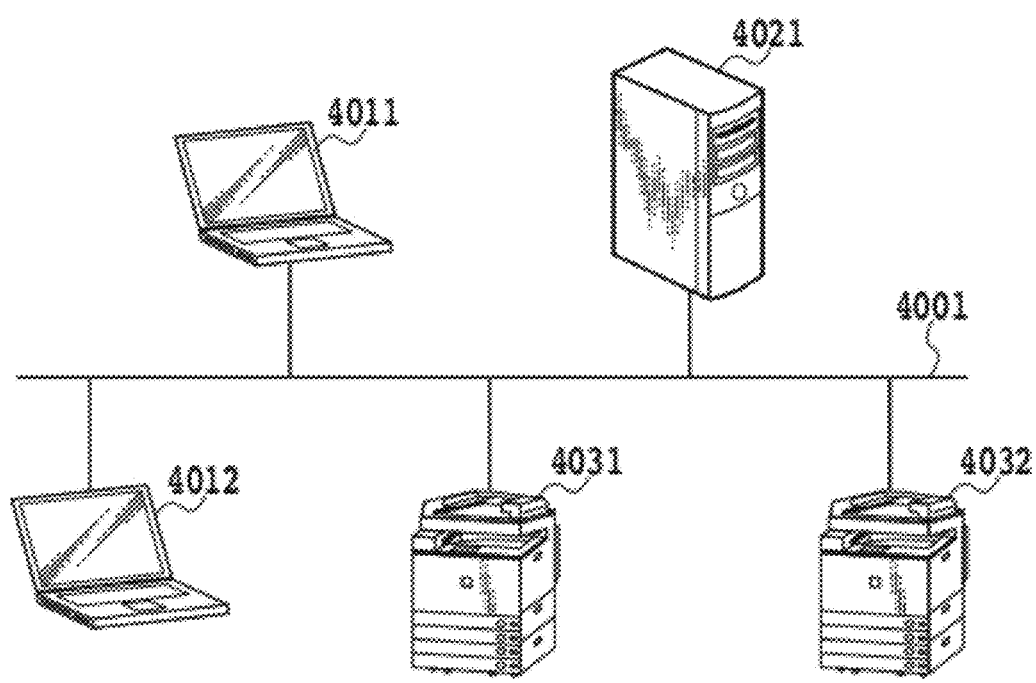
FIG. 1 is a diagram showing an entire configuration of a system of an embodiment of a present invention.

One embodiment of the present invention is described below with reference to drawings. FIG. 1 is a diagram showing an entire configuration of a system of this embodiment of the present invention. In FIG. 1, reference numerals 4011 and 4012 represent client PCs, 4021 represent a print server, and 4031 and 4032 represent image forming devices each having functions of a copy machine and a printer. These devices are connected to each other with a LAN 4001, and each have a function for making communication via the LAN 4001.

Once a user operates the client PC 4011 or 4012 to perform a print, the client PC 4011 or 4012 generates print data including a print instruction to the image forming device. Thereafter, the client PC 4011 or 4012 transmits the generated print data to the print server 4021. The print server 4021 transmits the received print data to the image forming device 4031 or 4032.

The image forming device 4031 or 4032 interprets the received print data to convert into an image, and prints the image on a sheet of paper so as to generate a printed material.

Incidentally, the above configuration is merely an example, and, of course, a configuration without print server 4021 may be considered. In that case, the client PC 4011 or 4012 directly transmits the print data to the image forming device 4031 or 4032.

Next, all operations of the present system are briefly described.

In the configuration shown in FIG. 1, when operating the client PC 4011 or 4012, the user gives an instruction to embed, into a printout, information for a copy inhibit or for tracking a printout. Thereafter, in the printout generated by the image forming device 4031 or 4032, an image including information for a copy inhibit or for tracking the printout is embedded as a background image.

Figure 2:
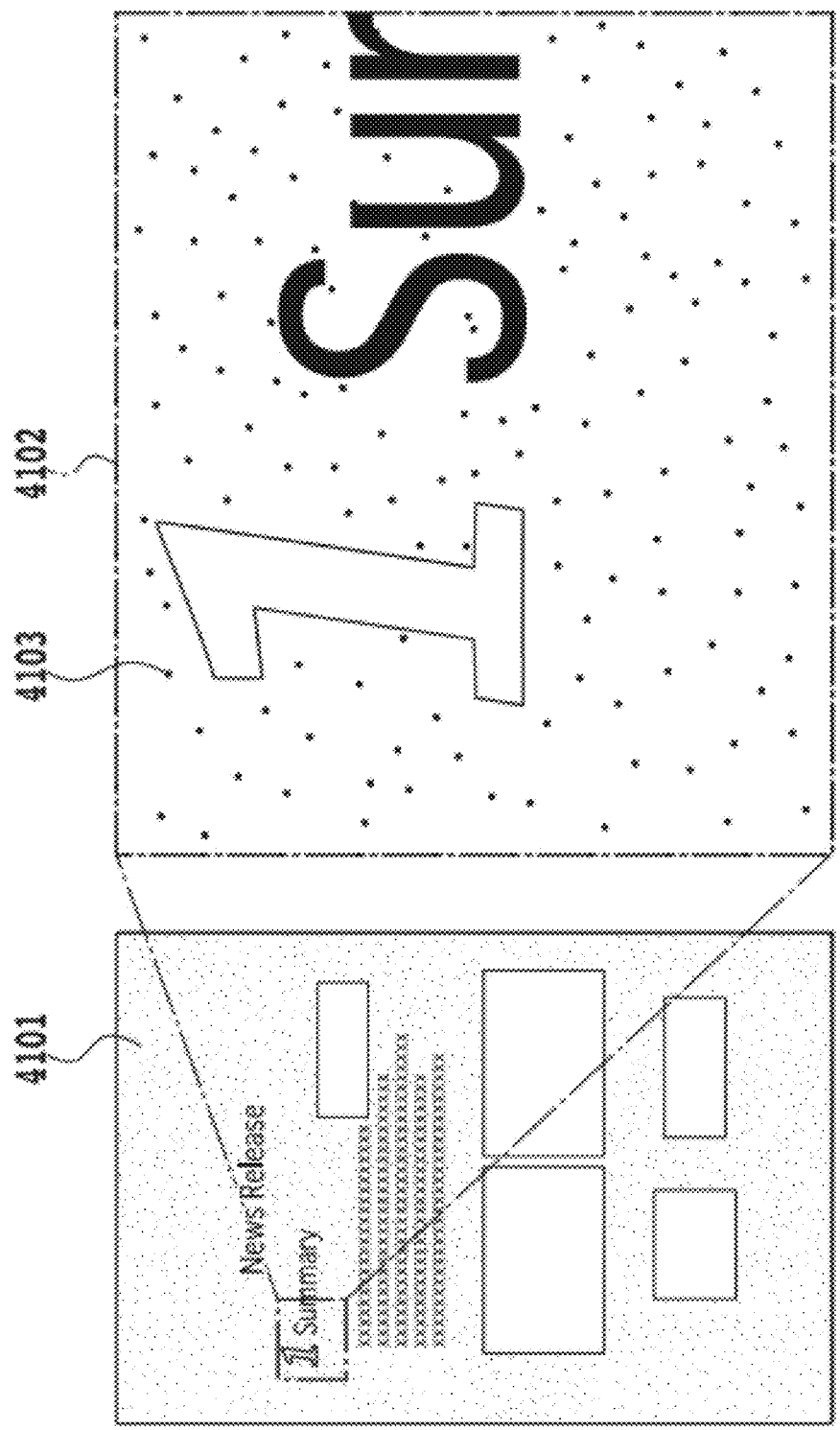
FIG. 2 is an image view showing an example of a document embedded with LVBC.

FIG. 2 shows an example of the printout including the background image. FIG. 2 is an image view showing an example of a document into which LVBC is embedded as the background image.

The LVBC represents low visibility barcodes by the present applicant. LVBC satisfies the following requirements.

Capable of data embedding sufficient amount of information which is needed for embedding information into a sheet;
Information which has been embedded into a sheet using color material (toner, ink, or the like) can be securely extracted later as digital information;
When copying an image of a document onto a sheet, a certain level of resistance is provided to factors blocking an extraction of the information, the factors being a rotation, enlargement, reduction, partial deletion of the document, signal deterioration caused by copying, smudge and the like; and
Capable of being extracted in real time or at high-speed similar to real time at time of copying, to prevent copying of a copy inhibit document.

LVBC satisfying the above requirements are outputted as a collection of dots in the background as shown in FIG. 2.

In FIG. 2, reference numeral 4101 represents the whole sheet, and 4102 represents an enlarged view of 4101. On 4102, in addition to an image originally drawn on the document, numbers of dots (e.g., 4103) being LVBC can be confirmed, which seems to be embedded at random. Information to be added is embedded into these dots.

The background image with the LVBC has two types of areas (a first area and a second area).

Added pieces of information are divided into two types each having different characteristics depending on how the additional information is used, and are embedded in the form so that they can be individually extracted. The first area embeds therein information necessary to be extracted at high speed at the time of a copy operation in a usual scan, such as information indicating a copy restriction. Irrespective of a document, an extraction process is performed so that a delay of the extraction process has an influence on the whole copy speed. Thus, an analysis speed which is equal to, for example, the speed of a scan process is required. Meanwhile, only a very small amount of information is necessary to restrict copying and, consequently, only a small data size is necessary to embed security additional information. The second area embeds therein information having a comparatively large data size such as tracking information.

In order to meet the above different requirements, the first and second areas may be embedded in a mixed manner. As described above, depending on a use case, a selection may be made from among an extraction of only the first area, an extraction of only the second area, and an extraction of both the first and second areas. In addition, in extraction of only the first area, an analysis speed may be increased so that an extraction process is performed at a speed at which there is no influence on the productivity of a copying operation. In this embodiment, as the background image (base), the first area is adopted from which a high-speed extraction can be made at the time of copying in a usual scan.

Figure 24:
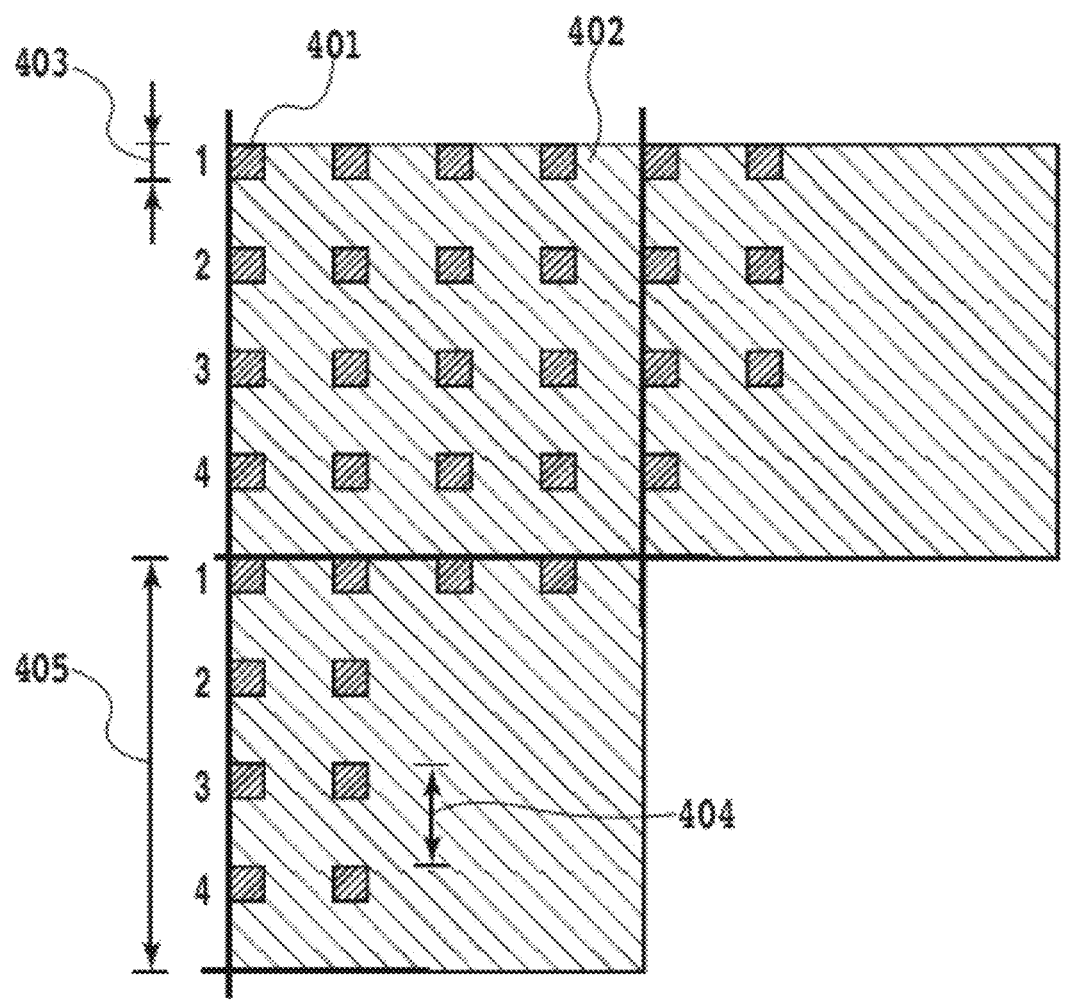
FIG. 24 is a diagram for explaining LVBC.

In FIG. 24, shown is a schematic diagram showing the disposition of the first areas and the second areas, in a case when the information is embedded into a sheet by LVBC. Quadrilateral areas denoted by 401 represent the first area. Similar quadrilateral areas are embedded in periodic, in all of which the same data are stored. The first areas are repeatedly embedded, in order to increase redundancy and enhance reliability against noise and error. Quadrilateral areas denoted by 402 represent the second area. For the second areas, similar quadrilateral areas are embedded in periodic. In the first areas 401, information in the second areas is not written, and writing on both areas are performed in an exclusive manner. 403 represents a size of the first area, 404 represents a repetition interval of the first area, and 405 represents a size of the second area.

According to the LVBC having the above described features, since the same pieces of data are repeatedly embedded, even when part of the data are deleted due to the embedding of other information, not all pieces of data are deleted. Accordingly, copy inhibit information and the like can be retained.

When the user tries to copy a document including copy inhibit information and the like with LVBC or the like such as that shown in FIG. 2 by using the image forming device 4031 or 4032, the image forming device 4031 or 4032 detects that the copy inhibit information is included in the document. Once the copy inhibit information is detected, a copying operation is restricted in accordance with a condition. Thus, an important document is prevented from being copied.

Operations of the entire system have been briefly described above. More specific description on how the series of these operations are performed is given below. Specific operations staring from the user's operation to a generation of a printout are described later with reference to FIGS. 11 and 12.

Figure 3:
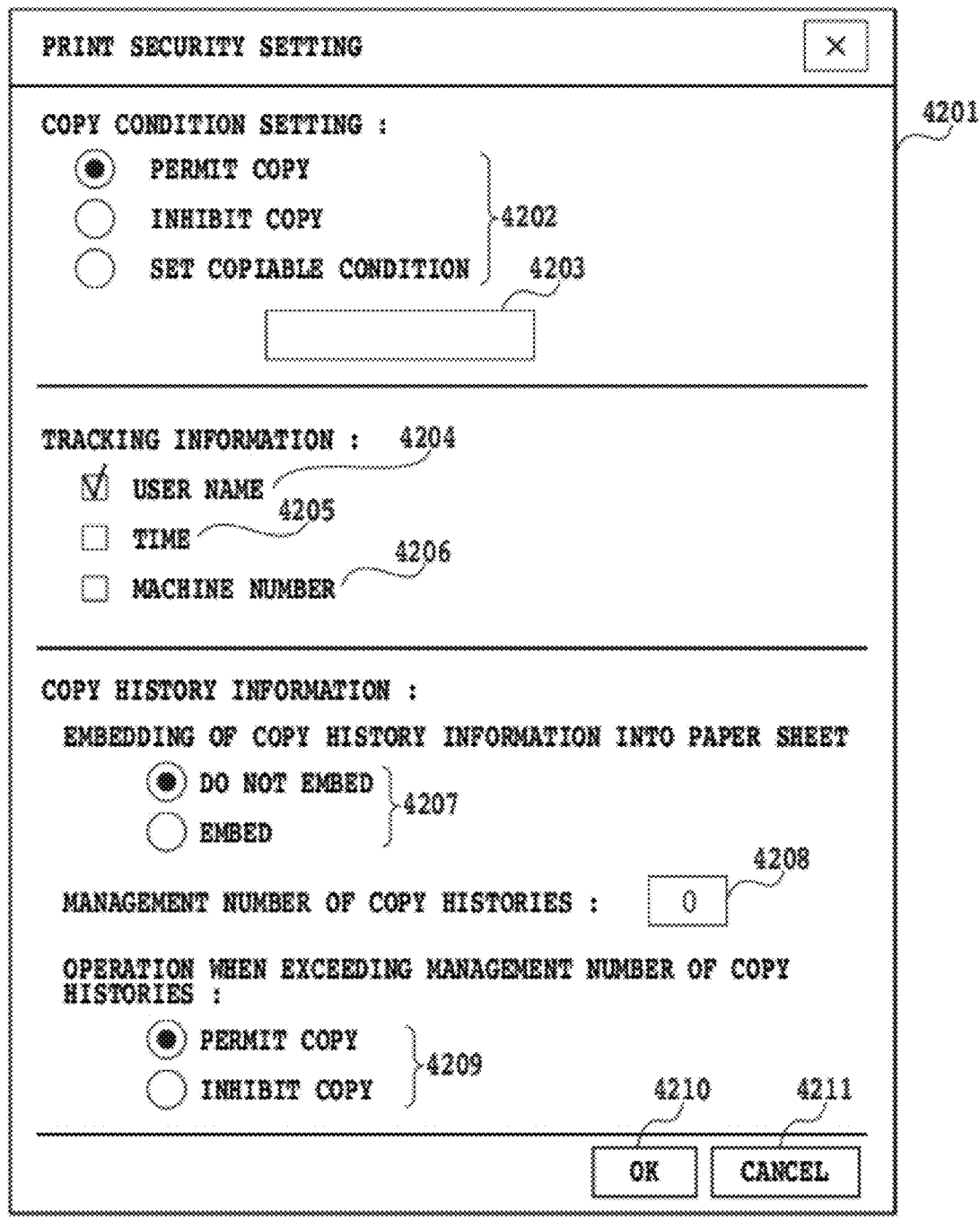
FIG. 3 is a view showing an example of a setting screen of a printer driver.

A setting screen of a printer driver in the client PC 4011 or 4012 is described below with reference to FIG. 3. FIG. 3 is an example of a setting screen of a printer driver in the client PC 4011 or 4012.

In FIG. 3, 4201 represents a print security setting dialogue as a user interface. The user operates radio buttons and check boxes in the dialogue to perform setting operation on security setting which is intended to be embedded into a printout.

The print security setting dialogue 4201 is divided into three major portions. An upper portion is for the setting of copy condition such as a copy inhibit, a middle portion is for the setting of tracking information, and a lower portion is for the setting of copy history information.

On the upper portion on which the copy condition is set, the user operates radio buttons 4202 to select one of the three conditions, "Copy is permitted," "Copy is inhibited," and "Copiable condition is set" in this embodiment. When the third option "Copiable condition is set" is selected, a password input field 4203 comes to a state in which input is possible, and the user can input a password which is to be necessary to unlock the copy inhibit.

On the middle portion of the print security setting dialogue 4201, on which the setting of tracking information is performed, three check boxes denoted by 4204, 4205, and 4206 are disposed in this embodiment. By checking the above check boxes 4204, 4205 and 4206, the user can instruct the embedding of user name, time information, and device information (device number) for identifying each individual image forming device, respectively.

On the lower portion of the print security setting dialogue 4201, a radio button 4207, "Embedding of copy history information into sheet," is disposed for setting whether history information of a copy is recorded on a sheet of paper. With this radio button 4207, it is possible to instruct whether to retain copy history (a specific embedding method is described later with reference to FIG. 19). Copy history information is embedded into an image area different from those for the above copy inhibit information and tracking information, and for each copy, embedded information is edited. In the radio buttons 4207, when "Embed" is selected, "Copy history management number" 4208 and "Operation when exceeding copy history management number" 4209 can be further set. "Copy history management number" 4208 represents the number of embeddable pieces of copy history information. According to the content set at the lower portion of the print security setting dialogue 4201, the pieces of the history information, at most, of a number indicated in "Copy history management number" 4208 are embedded.

"Operation when exceeding copy history management number" is set with the radio button 4209. When selecting "Copy is inhibited," a copying operation is restricted at the time of a copy in accordance with information embedded in a document read (details are described later with reference to FIG. 18). When the user presses an "OK" button 4210, each of the of the setting information described above is stored in a job restriction information holder 5004 to be described later with FIG. 11. Meanwhile, by pressing a "Cancel" button, the above settings can be cancelled.

Next, described is an example of a screen at the time when the image forming device 4031 or 4032 detects that the copy inhibit information is included in data of a read document. This screen is displayed on an operation unit 4512 to be described later with reference to FIG. 6.

Figure 4:
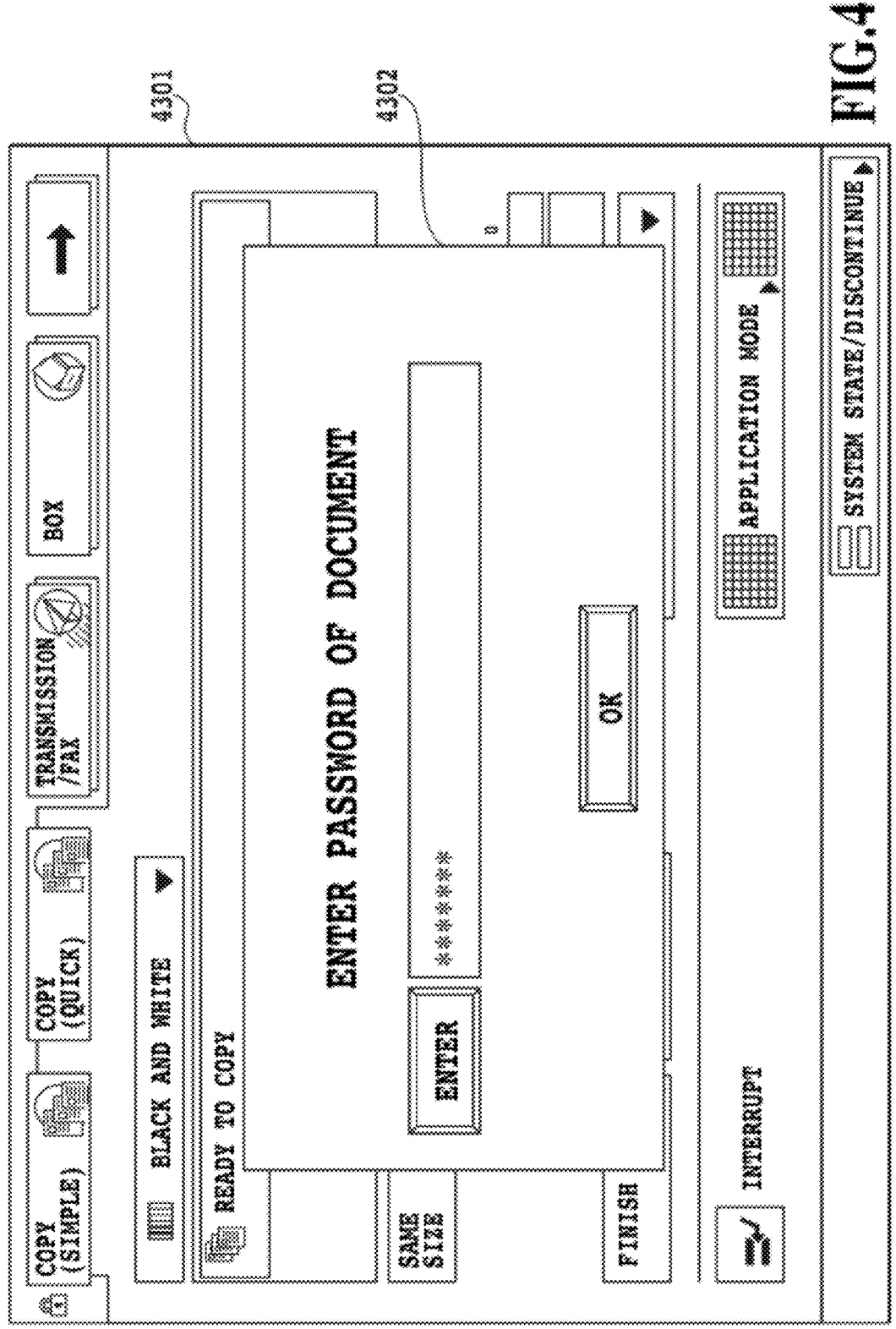
FIG. 4 is an example of a screen at the time when a copy operation of an image forming device is discontinued.

FIG. 4 shows an example of a screen at the time when the image forming device detects that the copy inhibit information is included in a read document, and discontinues the copy operation.

This screen is displayed when user try to copy a document embedded with copy inhibit information indicating "Copiable condition is set" among the three copy inhibit settings described in FIG. 3, in the image forming device.

In FIG. 4, reference numeral 4301 represents an operation screen, on which a dialogue 4302 expediting an input of a password is displayed.

Once the user inputs a password with a soft keyboard, an IC card (not shown), or the like, the image forming device determines whether a password included in the background image of a document is identical with the inputted password. When these passwords are identical with each other, the dialogue 4302 is closed and the copying operation is continued.

Meanwhile, when failing to input the password, the copying operation is discontinued.

Figure 5:
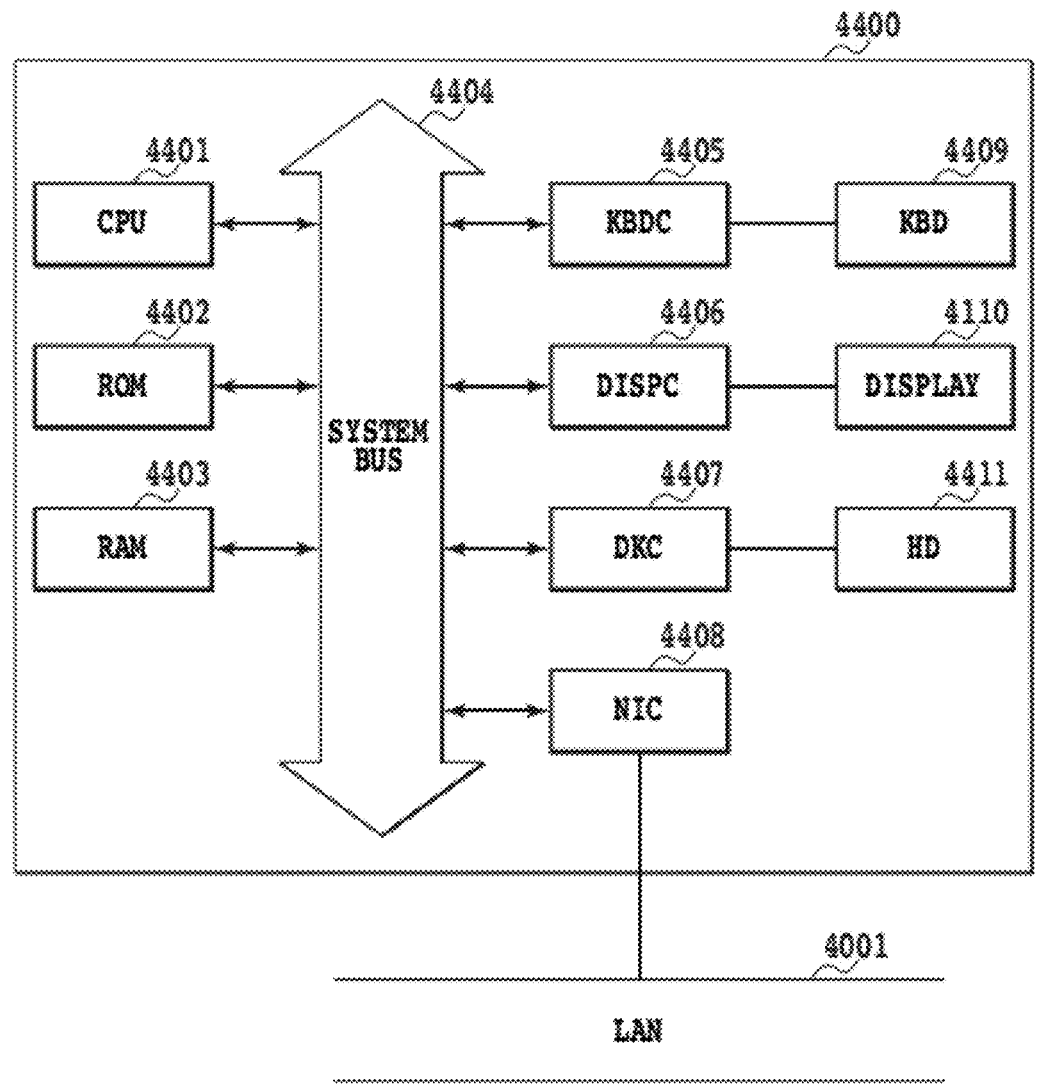
FIG. 5 is a block diagram showing internal configurations of a client PC and a server PC.

Next, internal configurations of the client PCs 4011 and 4012 and the print server 4021 are described by referring to FIG. 5.

FIG. 5 is a block diagram showing examples of internal configurations of the client PCs 4011 and 4012 and the print server 4021.

In FIG. 5, 4400 represents the entire PC. The PC 4400 is provided with a CPU 4401 that executes a software stored in a ROM 4402 or a mass storage device 4411 such as a hard disk drive (HDD), and the CPU 4401 controls each device connected to a system bus 4404 as a whole.

Reference numeral 4403 represents a RAM which functions as a main memory, a work area and the like of the CPU 4401. Reference numeral 4405 represents a keyboard controller (KBD C), and controls an instruction input from a keyboard 4409 provided to the PC. Reference numeral 4406 represents a display controller (DISP C), and controls the display of, for example, a display module (DISPLAY) 4410 constituted of a liquid crystal display and the like.

Reference numeral 4407 represents a disk controller (DKC), and controls a hard disk drive (HDD) 4411 which is a large capacity storage device.

Reference numeral 4408 represents a network interface card (NIC), and transmits and receives data to and form other device in a bidirectional manner via a LAN 4001.

Next, outline of the image forming device 4031 or 4032 is described with reference to FIG. 6.

Figure 6:
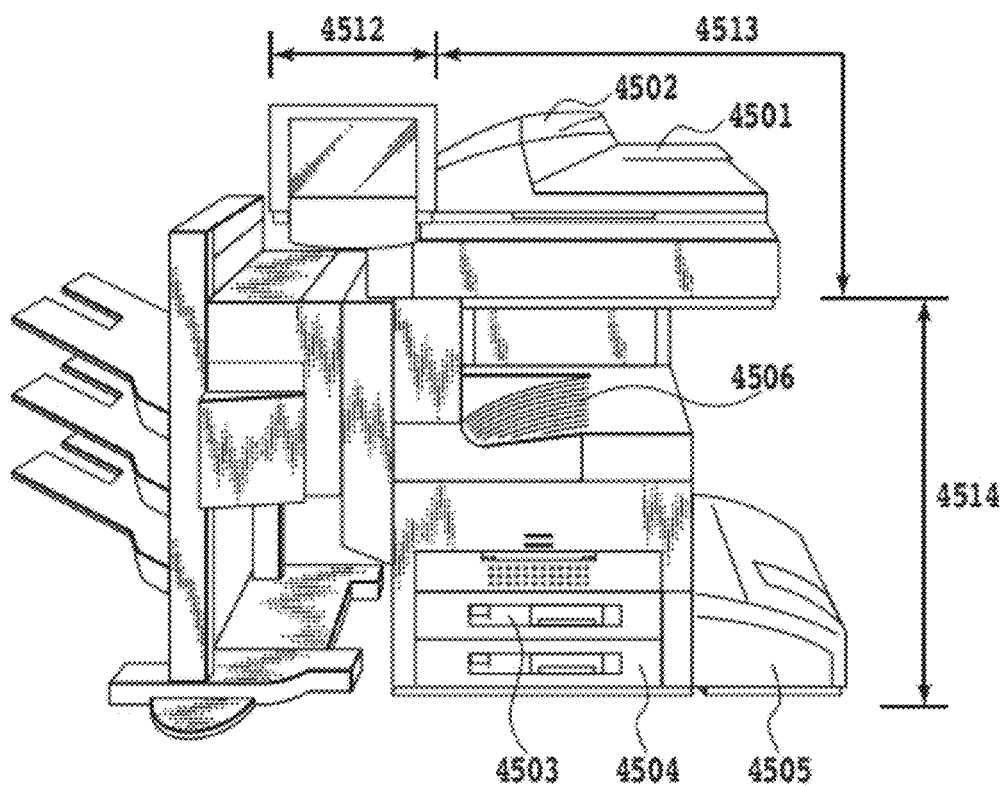
FIG. 6 is a view showing an exterior of the image forming device.

FIG. 6 shows an exterior of the image forming device 4031 or 4032. A scanner unit 4513 performs an exposure scan of an image on a document, inputs acquired reflection light into a CCD, and thereby, converts information of the image into an electric signal. The scanner unit 4513 further converts the electric signal into a luminance signal composed of each color R, G, and B, and outputs the luminance signal as image data to a controller 4511 to be described later with reference to FIG. 7.

Incidentally, documents are set onto a tray 4502 of a document feeder 4501. When the user instructs the start of reading from the operation unit 4512, the controller 4511 gives an instruction to the scanner unit 4513 to read the documents. When receiving this instruction, the scanner unit 4513 performs a document reading operation by feeding the documents on sheets one by one from the tray 4502 of the document feeder 4501. Meanwhile, the method of reading a document may not be an automatic feeding method by a feeder 4501, and may be a method in which a document is put on a glass surface (not shown) and scanned by moving an exposure unit.

A printer unit 4514 is an image forming device which forms, on a sheet of paper, image data received from the controller 4511. Further, in this embodiment, the image forming method is an electrophotographic method using a photosensitive drum or a photosensitive belt, while the present invention is not limited thereto. For example, an ink-jet method is also applicable in which printing is performed on a sheet of paper by discharging ink from a micronozzle array. On the printer unit 4514, a plurality of paper cassettes 4503, 4504, and 4505 are provided to enable selection of sheets of paper having different sizes or set in different directions. A printed sheet of paper is discharged to a discharge tray 4506.

Figure 7:
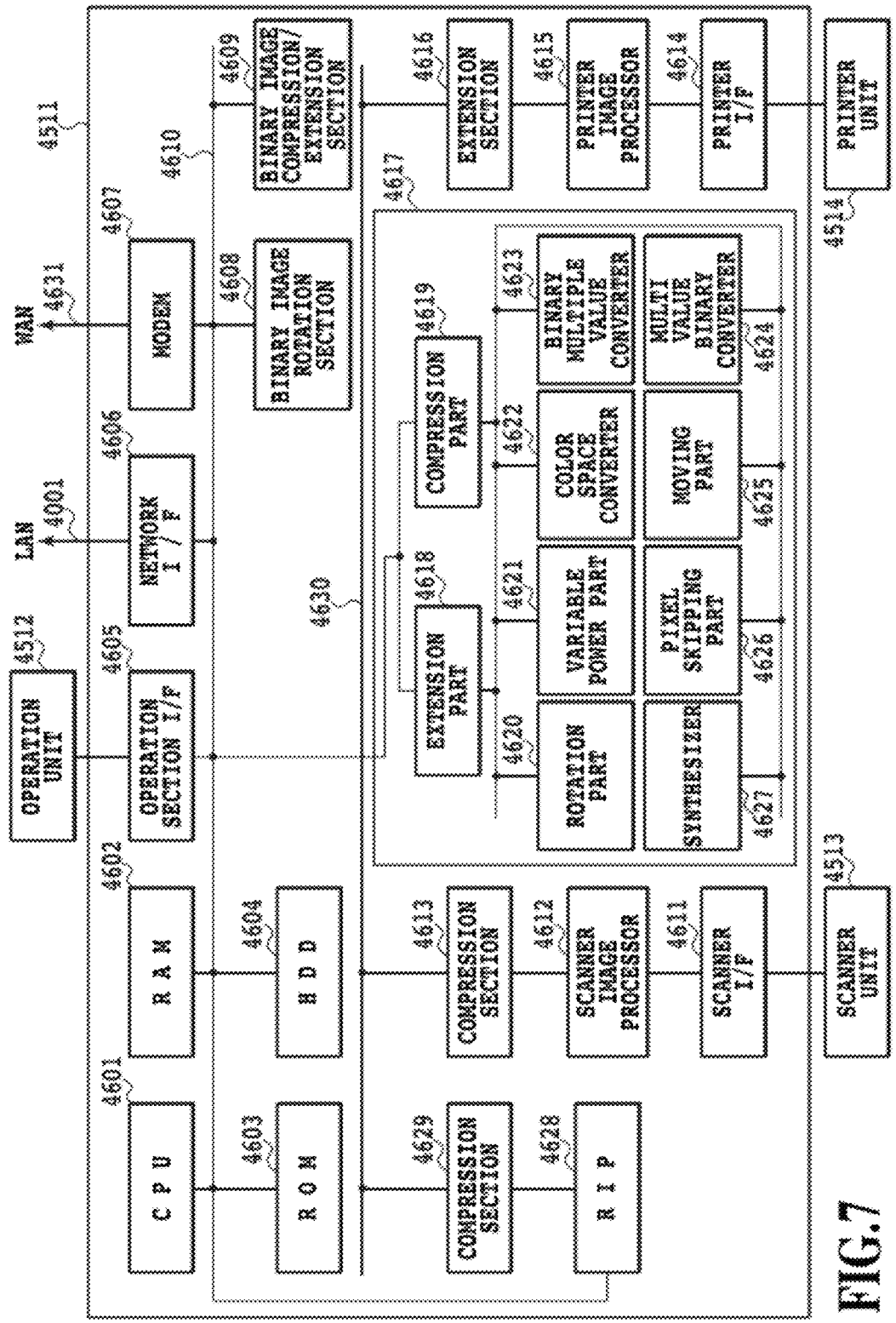
FIG. 7 is a block diagram showing an internal configuration of a controller of the image forming device.

Next, the controller 4511 is described in detail. FIG. 7 is a block diagram for describing in detail a configuration of the controller 4511 provided to the image forming device 4031 or 4032.

The controller 4511 is electrically connected to the scanner unit 4513 and the printer unit 4514, and is also connected to the print server 4021 and other external devices via a LAN 4001 and a WAN 4631. This enables input/output of image data and device information.

The CPU 4601 controls access to various connected devices based on a control program or the like stored in the ROM 4603 as a whole, and also controls various processes performed in the controller as a whole. The RAM 4602 is a system work memory for operating the CPU 4601, and also is a memory for temporarily storing image data. This RAM 4602 includes a nonvolatile SRAM which retains stored contents even after power is turned off, and a DRAM in which stored contents are eliminated after power is turned off. In the ROM 4603, a boot program for devices and the like are stored. A HDD 4604 is a hard disk drive capable of storing therein system software and image data.

An operation section I/F 4605 is an interface section which connects a system bus 4610 and the operation unit 4512. This operation section I/F 4605 receives image data to be displayed on the operation unit 4512 from the system bus 4610, and outputs the image data to the operation unit 4512, and also outputs information inputted from the operation unit 4512 to the system bus 4610.

A network I/F 4606 is connected to the LAN 4001 and the system bus 4610 to perform input/output of information. A modem 4607 is connected to a WAN 4631 and the system bus 4610 to perform input/output of information. A binary image rotation section 4608 changes the direction of image data before transmission. A binary image compression/extension section 4609 changes the resolution of the image data before transmission to a predetermined resolution, or to resolution suitable to the performance of communicating target. Incidentally, methods such as JBIG, MMR, MR, and MH are used for the compression/extension. The image bus 4630 is a transmission path for transmitting and receiving image data, and includes a PCI bus or a IEEE 1394.

A scanner image processor 4612 performs correction, modification, and edit on image data received via a scanner I/F 4611 of scanner unit 4513. Further, the scanner image processor 4612 determines whether the received image data is a color document or a black-and-white document, and whether the received image data is a character document or a photograph document. Thereafter, the scanner image processor 4612 attaches a result thus determined to the image data. Such attached information is referred to as attribute data. Processes to be performed in the scanner image processor 4612 are described in detail later.

Figure 8:
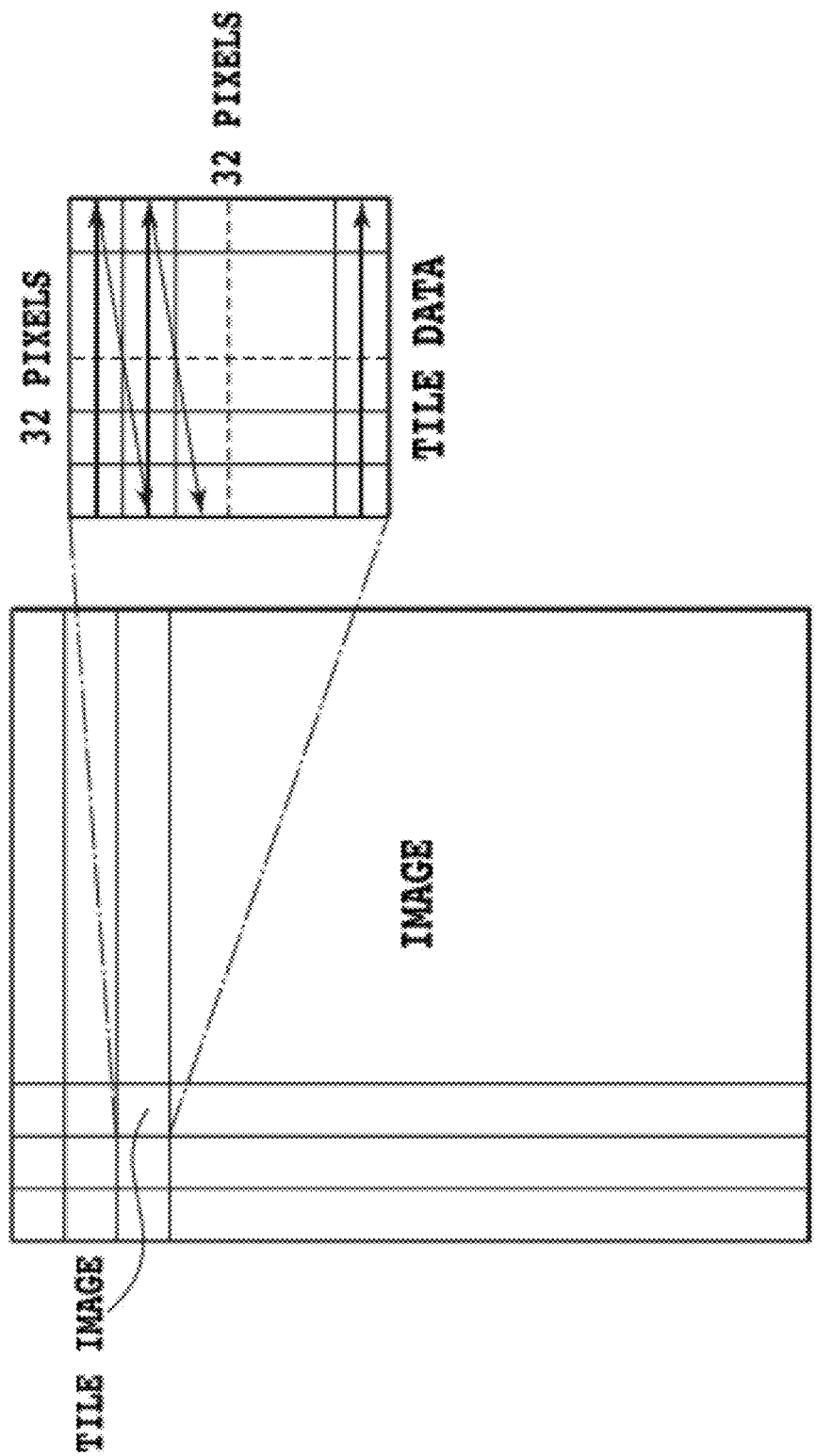
FIG. 8 is a conceptual diagram showing tile data.

A compression section 4613 receives image data, and divides the image data into units of blocks each having 32 pixels by 32 pixels. Incidentally, the image data of 32 by 32 pixels is referred to as tile data. FIG. 8 conceptually shows the tile data. On a document (a paper medium before being read), an area corresponding to the tile data is referred to as a tile image. In addition, to the tile data, average luminance information on a block of 32 by 32 pixels, and coordinate positions of the tile image on the document are added as a header information. Further, the compression section 4613 compresses image data formed of a plurality of pieces of tile data. An extension section 4616 extends image data formed of a plurality of pieces of tile data and, thereafter, transmits the data which have been expanded into raster data to the printer image processor 4615.

The printer image processor 4615 receives image data transmitted from the extension section 4616, and performs an image processing on the image data thus received by referring to attribute data attached to the received image data. The image data after performing the image process is outputted to the printer unit 4514 via a printer I/F 4614. Processes performed in the printer image processor 4615 are described in detail later.

An image converter 4617 performs a predetermined conversion process on image data. This process part includes the following process part.

An extension part 4618 extends received image data. A compression part 4619 compresses received image data. A rotation part 4620 rotates received image data. A variable power part 4621 performs a resolution conversion process (e.g., from 600 dpi to 200 dpi) on received image data. A color space converter 4622 converts a color space of received image data. This color space converter 4622 is capable of performing a known background removal process by using a matrix or a table, a known LOG conversion process (RGB→CMY), and a known output color correction process (CMY→CMYK). A binary multiple-value converter 4623 converts received two gradations image data into those 256 gradations image data. By contrast, multiple-value binary converter 4624 converts received 256 gradations image data into two gradations image data by using an error diffusion method or the like.

A synthesizer 4627 synthesizes two received pieces of image data so as to generate one piece of image data. Note that, when synthesizing two pieces of image data, a method is employed in which a synthesized luminance value is an average of the luminance values of pixels of synthesizing targets, or in which a luminance value after synthesizing is a luminance value of a synthesizing target with brighter pixels in luminance level. Alternatively, a method may be employed in which a luminance value after synthesizing is a luminance value of a synthesizing target with darker pixels. Further, it is also possible to adopt a method in which a luminance value after synthesizing is determined by performing inclusive-OR operation, AND operation AND, exclusive-OR operation, and the like on pixels of synthesizing targets. These synthesizing methods are known methods. A pixel skipping part 4626 performs a resolution conversion by skipping pixels of received image data, so as to generate image data such as those of ½, ¼, or ⅛. A moving part 4625 adds a blank space to or removes a blank space from received image data.

A RIP (Raster Image Processor) 4628 receives intermediate data generated based on PDL code data transmitted from the print server 4021 and the like, and generates bitmap data (multiple value). The compression section 4629 compresses the bitmap data generated by the RIP 4628.

Next, the scanner image processor 4612 is described in detail with reference to FIG. 9.

Figure 9:
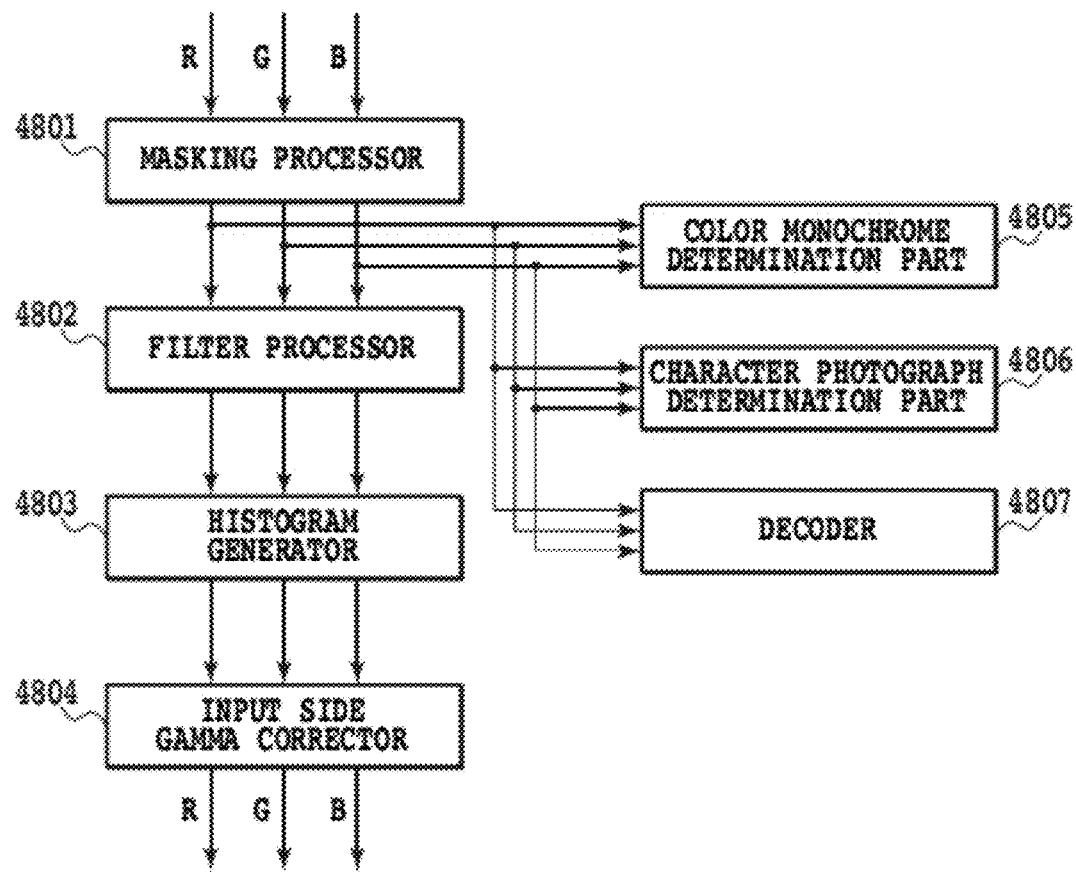
FIG. 9 is a block diagram showing an internal configuration of a scanner image processor.

FIG. 9 is a diagram showing an internal configuration of the scanner image processor 4612.

The scanner image processor 4612 receives image data composed of luminance signals of RGB of 8-bit each. The luminance signal is converted into a standard luminance signal which is independent of filter colors of a CCD by a masking processor 4801.

A filter processor 4802 corrects a special frequency of received image data as needed. This processor performs, for example, a processing on received image data by using a predetermined 7 by 7 matrix. On a copy machine or on a multifunction copy machine, a user can select a character mode, photograph mode, or character/photograph mode as a copy mode by operating the operation unit 4512. When the character mode is selected by the user, a filter processor 4802 applies a filter for character to the entire image data. When the photograph mode is selected, a filter for photograph is applied to the entire image data. When the character/photograph mode is selected, filters are adaptively switched for each pixel depending on a character photograph determination signal (part of attribute data) to be described later. That is, for each pixel, it is determined whether to apply the filter for character or the filter for photograph. Meanwhile, to the filter for photograph, a coefficient is set so that the smoothing of only high frequency component is performed. This is set to make roughness on an image to be less visible. Further, to the filter for character, a coefficient is set so that the edges are highlighted to high degree. This is set to achieve sharpness in characters.

A histogram generator 4803 samples luminance data of respective pixels constituting received image data. To be more specific, luminance data in a rectangular area which is circumscribed from start points to end points designated each for a main scan direction and a sub scan direction are sampled at a fixed pitch in the main scan direction and the sub scan direction. Based on sampling data, histogram data is generated. The histogram data thus generated is used for estimating a background level when performing the background removal process. An input side gamma correction part 4804 converts luminance data having a nonlinear characteristic by using a table or the like.

A color monochrome determination part 4805 determines whether each pixels constituting received image data has color or has no color, and attaches a determination result thus made to the image data as a color monochrome determination signal (part of attribute data).

A character photograph determination part 4806 determines whether each of pixels constituting image data is a pixel constituting a character, a pixel constituting a halftone dot, a pixel constituting a character in halftone dot, or a pixel constituting a solid image, based on pixel values of each of the pixels, and pixel values of peripheral pixels of each of the pixels. A pixel not valid for any of the above is a pixel constituting a white area. A determination result thus made is attached to the image data as a character photograph determination signal (part of attribute data).

A decoder 4807 detects the presence of code image data when the code image data is present in image data outputted from the masking processor 4801. Thereafter, the decoder 4807 decodes the code image data and acquires information therefrom.

Next, the printer image processor 4615 is described in detail with reference to FIG. 10.

Figure 10:
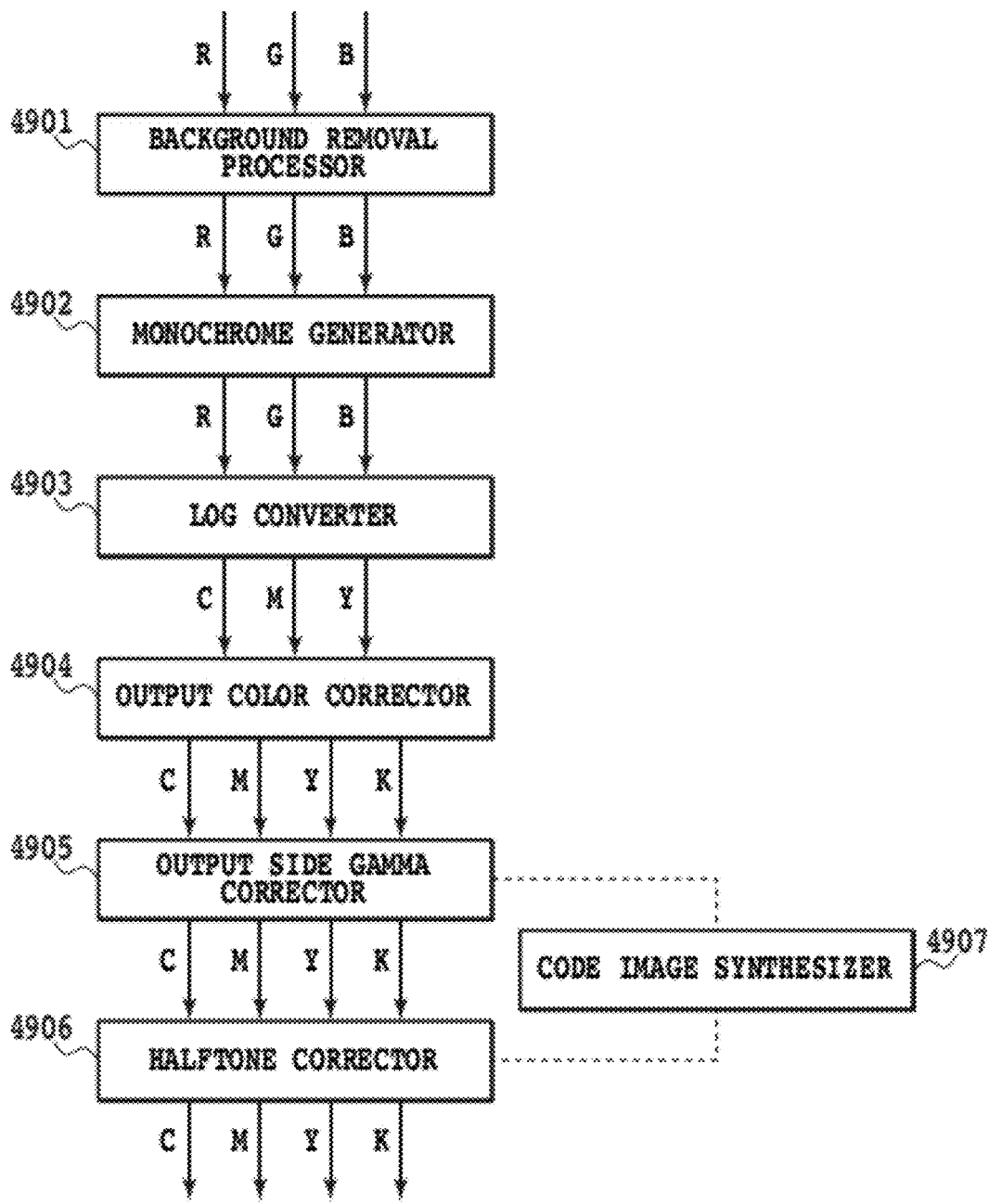
FIG. 10 is a block diagram showing an internal configuration of a printer image processor.

FIG. 10 shows an internal configuration of the printer image processor 4615.

A background removal processor 4901 removes the background color of image data using a histogram generated by the scanner image processor 4612. A monochrome generator 4902 converts color data into monochrome data. A Log converter 4903 performs a luminance-density conversion. For example, this Log converter 4903 converts RGB inputted image data into CMY image data. An output color correction part 4904 performs an output color correction. For example, the output color correction part 4904 converts CMY inputted image data into CMYK image data by using a predetermined table or matrix. An output side gamma correction part 4905 performs a correction so that a signal value inputted into the output side gamma correction part 4905 and a reflection density value after copying are proportional to each. A code image synthesizer 4907 synthesizes background image data generated by a meta information image generator to be described later, and image data (document). A halftone correction part 4906 performs a halftone process in accordance with a tone number of a printer unit to be outputted. For example, the halftone correction part 4906 converts received high tone image data into a 2-value or a 32-value image data.

The scanner image processor 4612 and the printer image processor 4615 are each capable of outputting received data without performing the respective processes. Making data pass through a processor without performing any process is expressed as "pass through a processor."

Next, a state in which a printout including the following job restriction information is generated in the configuration of FIG. 1 will be described in detail by referring to FIGS. 11 and 12.

There are two types of methods to generate printout. One is in which the background image of a printout (including job restriction information) is generated on the client PC side, and the other in which the background image of a print out is generated on the image forming device side. In the following description, the former method is described with reference to FIG. 11, and the latter method is described with reference to FIG. 12.

Figure 11:
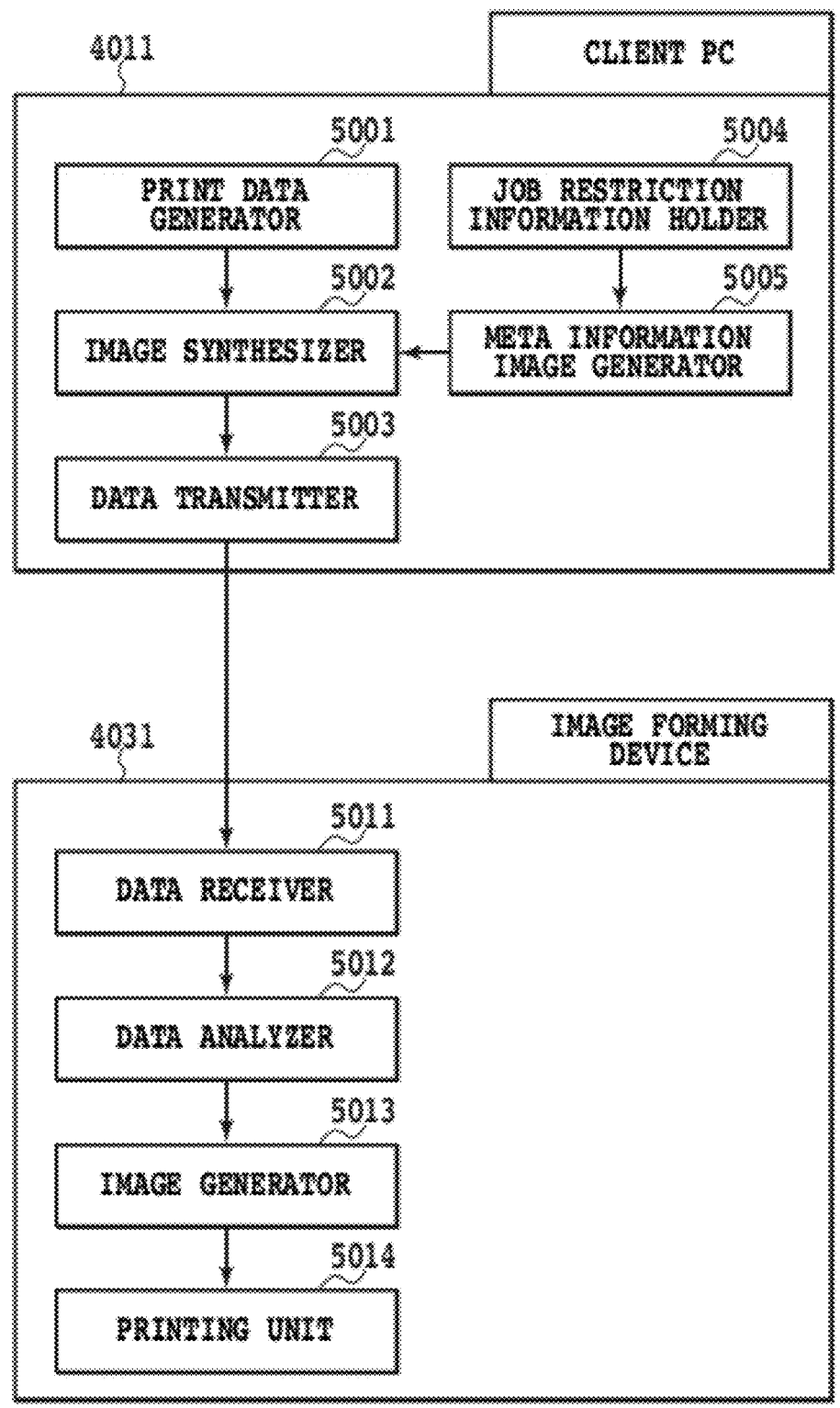
FIG. 11 is a data flow diagram for explaining generation of an image including copy inhibit information.
Figure 12:
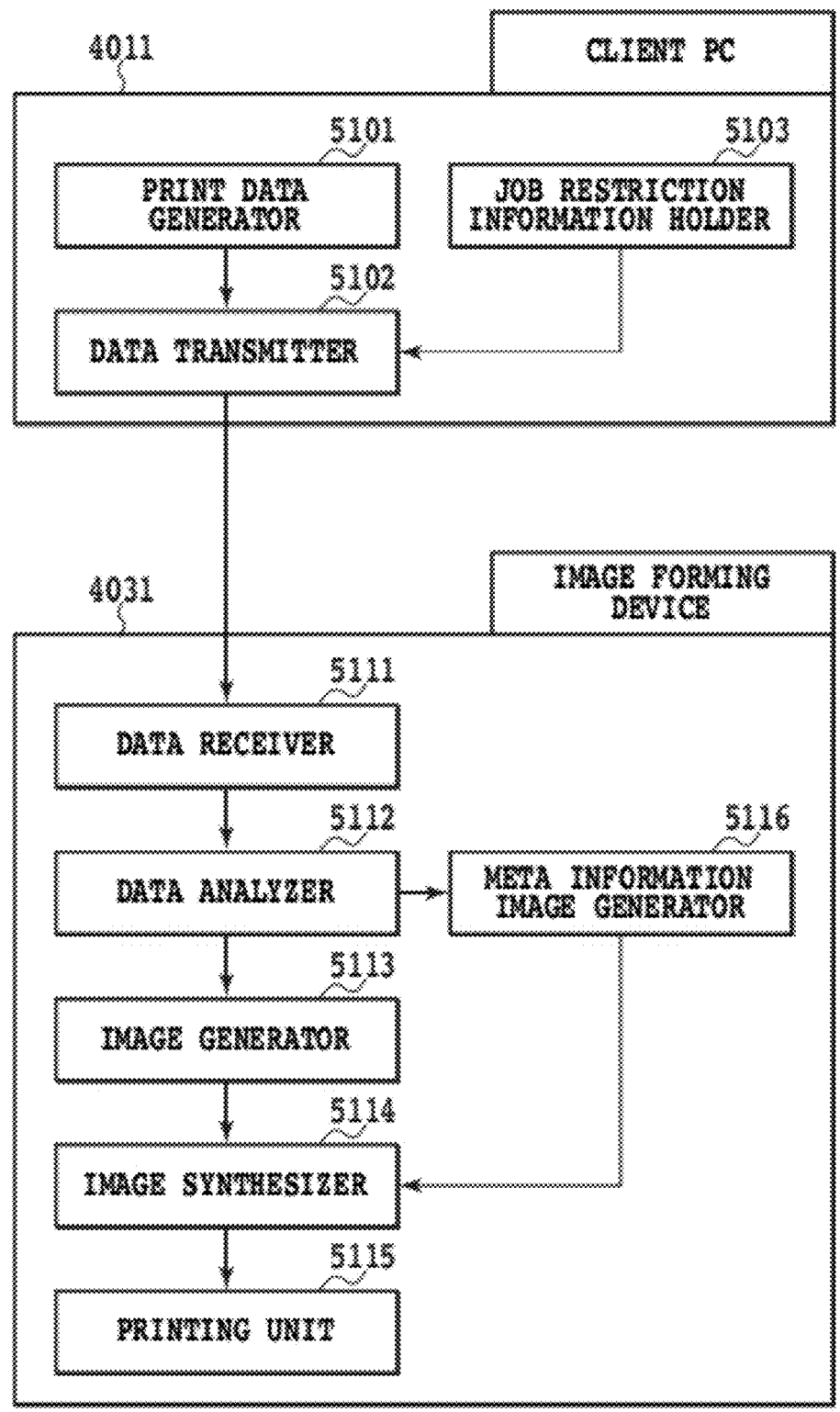
FIG. 12 is a data flow diagram for explaining generation of an image including copy inhibit information.

FIGS. 11 and 12 are depicted as logic configuration diagrams showing flows of data process of the client PC and the image forming device. Therefore, each block does not necessarily have a one-to-one correspondence with a physical constituent element of the client PC or the image forming device. In the following description, the following determination and execution are performed by the CPU 4401.

First, the method in which the background image of a printout is generated on the client PC side is described. As described above, FIG. 11 is a data flow diagram showing a generation of a printout in the case where an implementation method is adopted in which the background image of a printout is generated on the client PC side.

In FIG. 11, an upper half of the drawing shows the client PC 4011. In the client PC 4011, a user performs a print instruction operation so as to start a print data generator 5001. The print data generator 5001 is implemented by a print subsystem in which a printer driver and an OS operate in a coordinated manner. The print data generator 5001 converts a document which the user has instructed to print, into a collection of drawing instructions to the image forming device. More specifically, it is implemented by, for example, generating a Page Description Language (PDL) data. The print data generator 5001 transmits generated print data to an image synthesizer 5002.

Meanwhile, a job restriction information holder 5004 transmits, to a meta information image generator 5005, job restriction information (copy inhibit information, tracking information) held as a result of an operation performed by the user on the security setting dialogue of FIG. 3.

A meta information image generator 5005 generates a background image including copy inhibit information and tracking information, based on job restriction information received from the job restriction information holder 5004. Incidentally, the background image also includes positional information indicating the position of an area into which copy history information is embedded.

As a creating method for this background image, there is, for example, a method using the above-described LVBC. The meta information image generator 5005 transmits a generated background image to the image synthesizer 5002.

The image synthesizer 5002 synthesizes the print data received from the print data generator 5001 and the background image received from the meta information image generator 5005, and creates an instruction to the image forming device, so that the background image is on each page of the print data. More specifically, there is a method in which, for example, the background image is embedded into PDL data as overlay form information. The image synthesizer 5002 transmits the print data thus synthesized to a data transmitter 5003.

The data transmitter 5003 controls the network interface 4408 and transmits the synthesized print data to the print server 4021, or to the image forming device 4031 or 4032. Since FIG. 11 is for illustrating the logical flow of data, the server 4021 is omitted even when it is interposed in the middle of the flow.

Next, operation on the client PC 4011 side corresponding to the lower half of FIG. 11 is described.

A data receiver 5011 waits for data from the LAN 4001 by controlling the network interface 4606. The data receiver 5011 detects that data has been transmitted from other node on the LAN, and passes the received data to a suitable subsystem in accordance with the type of the detected data. The type of the data is usually identified by using a port number when the communication method is TCP/IP, for example. In this embodiment, the received data is print data including a print instruction to the image forming device. After identifying that the received data is print data, the data receiver 5011 passes the data to a data analyzer 5012.

The data analyzer 5012 takes out a drawing instruction (PDL) from the data received from the data receiver 5011, and interprets the drawing instruction so as to generate intermediate data to be internally used in the image forming device. The data analyzer 5012 transmits pieces of intermediate data thus generated in sequence to an image generator 5013.

The image generator 5013 controls the above described RIP 4628 to convert the pieces of intermediate data received from the data analyzer 5012 into bitmap images. The image generator 5013 compresses the bitmap images by using a compression section 4629 and, thereafter, transmits the bitmap images to a printing unit 5014 in sequence.

The printing unit 5014 controls the extension section 4616, the printer image processor 4615, the printer I/F 4614, and the printer unit 4515, which have been described above, to print the bitmap images received from the image generator 5013 on paper.

Next, a method in which the background image of a printout is generated the image forming device side is described. FIG. 12 is a data flow diagram showing a generation of a printout in the case where an implementation method is adopted in which the background image of a printout is generated on the image forming device side.

In FIG. 12, an upper half of the drawing shows the client PC 4011. In the client PC 4011, the user performs a print instruction operation so that a print data generator 5101 is started. Operations of the print data generator 5101 are the same as those of the print data generator 5001 in FIG. 11, and further description is omitted. The print data generator 5101 transmits the generated print data to a data transmitter 5102.

Meanwhile, a job restriction information holder 5103 transmits, to the data transmitter 5102, job restriction information held as a result of an operation performed by the user on the security setting dialogue of FIG. 3. The data transmitter 5102 merges the print data received from the print data generator 5101 and the job restriction information received from the job restriction information holder 5103 as to be print instruction data to the image forming device. Thereafter, the data transmitter 5102 controls the network interface 4408 and transmits the print instruction data generated by the above merging, to the print server 4021 or to the image forming device 4031 or 4032. Since FIG. 12 is for illustrating the logical flow of data, the print server 4021 is omitted even when it is interposed in the middle of the flow.

Next, operations on the image forming device 4031 side corresponding to the lower half of FIG. 12 is described.

Operation of a data receiver 5111 is the same as that of the data receiver 5011 in FIG. 11, so that further description is omitted.

A data analyzer 5112 extracts the job restriction information and a drawing command (PDL command) from data received from the data receiver 5111. A data analyzer 5112 transmits the extracted job restriction information to a meta information image generator 5116.

Meanwhile, operation of processing the drawing command extracted by the data analyzer 5112 is the same as that of the data analyzer 5011 in FIG. 11, so that further description of the operation is omitted.

A image generator 5113 is the same as the image generator 5013 in FIG. 11, so that a further description thereof is omitted. However, the image generator 5113 transmits a generated bitmap to an image synthesizer 5114.

The meta information image generator 5116 interprets the job restriction information received from the data analyzer 5112, and generates a background image in accordance with the job restriction information by using a technology such as LVBC for embedding information into an image. This background image also includes positional information indicating the position of an area into which copy history information is embedded. The meta information image generator 5116 transmits the generated background image to the image synthesizer 5114.

The image synthesizer 5114 synthesizes the bitmap received from the image generator 5113 and the background image received from the meta information image generator 5116, and transmits, to a print unit 5115, bitmaps of a result obtained from the synthesizing.

Operation of the print unit 5115 is the same as that of the print unit 5014 in FIG. 11, so that a further description of the operation is omitted.

Next, copy inhibit operation in the image forming device is described with reference to FIGS. 13 and 7.

Figure 13:
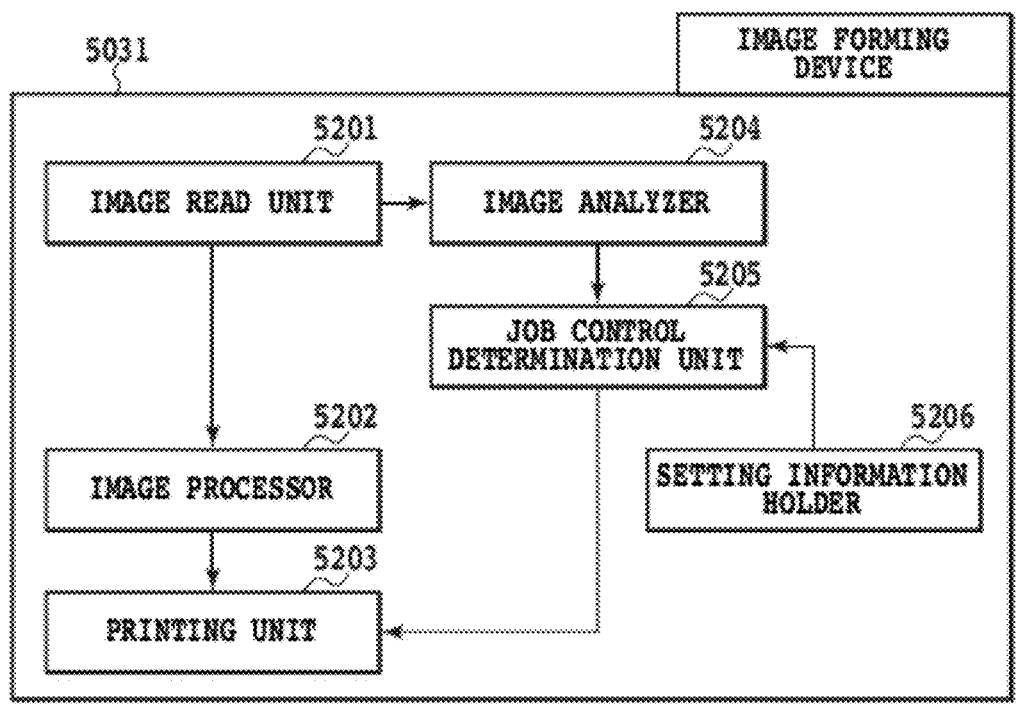
FIG. 13 is a block diagram for explaining copy inhibit operation in the image forming device.

FIG. 13 is a block diagram for explaining copy inhibit operation in the image forming device.

Incidentally, it is assumed that conditions (time, date and user authentication information) and the like for discontinuing a copy operation are set in advance, and stored in a setting information holder 5206.

When the user puts a document including copy inhibit information on the scanner unit 4513 and gives an instruction of starting a copy by operating the operation unit 4512, a image read unit 5201 is started so that a copy operation is started. The image read unit 5201 controls the scanner unit 4513, the scanner I/F 4611, the scanner image processor 4612, and the compression section 4613, reads a document image, and transmits image data thereof to an image processor 5202 and also to an image analyzer 5204.

The image analyzer 5204 controls the decoder 4807, and extracts the copy inhibit information included in the image received from the image read unit 5201. The image analyzer 5204 transmits the extracted copy inhibit information to a job control determining unit 5205.

The job control determining unit 5205 determines whether the copy operation is to be discontinued by comparing contents of the copy inhibit information received from the image analyzer 5204 and the copy inhibit condition held in the setting information holder 5206.

When determining that the copy operation is to be discontinued, the job control determining unit 5205 transmits a command for discontinuing the copy operation to a print unit 5203. At the same time, the job control determining unit 5205 controls the operation section I/F 4605, and displays the message described in the screen display example of FIG. 4 on the operation unit 4512.

The print unit 5203 generates a printout by printing the image data received from the image processor 5202 on a sheet of paper. But when receiving the command for discontinuing the copy operation from the job control determining unit 5205, the print unit 5203 discontinues the print operation even if it is in the middle of the job.

In the description of FIG. 12 above, when the image forming device generates a printout including the copy inhibit information, the user is assumed to instruct the printing of a file in the client PC. However, the including of the copy inhibit information in the background image of a printout is not only performed in response to a print instruction from the client PC; it is possible to configure the image forming device so as to include the copy inhibit information in the background of a printout when copying a paper document.

In this case, the configuration may be interpreted in the sense that an image read unit 5201 corresponds to the client PC 4011 of FIG. 12, and the data transmitter 5102 and the data receiver 5111 represent an image bus 4630 in the image forming device, not a network interface.

Figure 14:
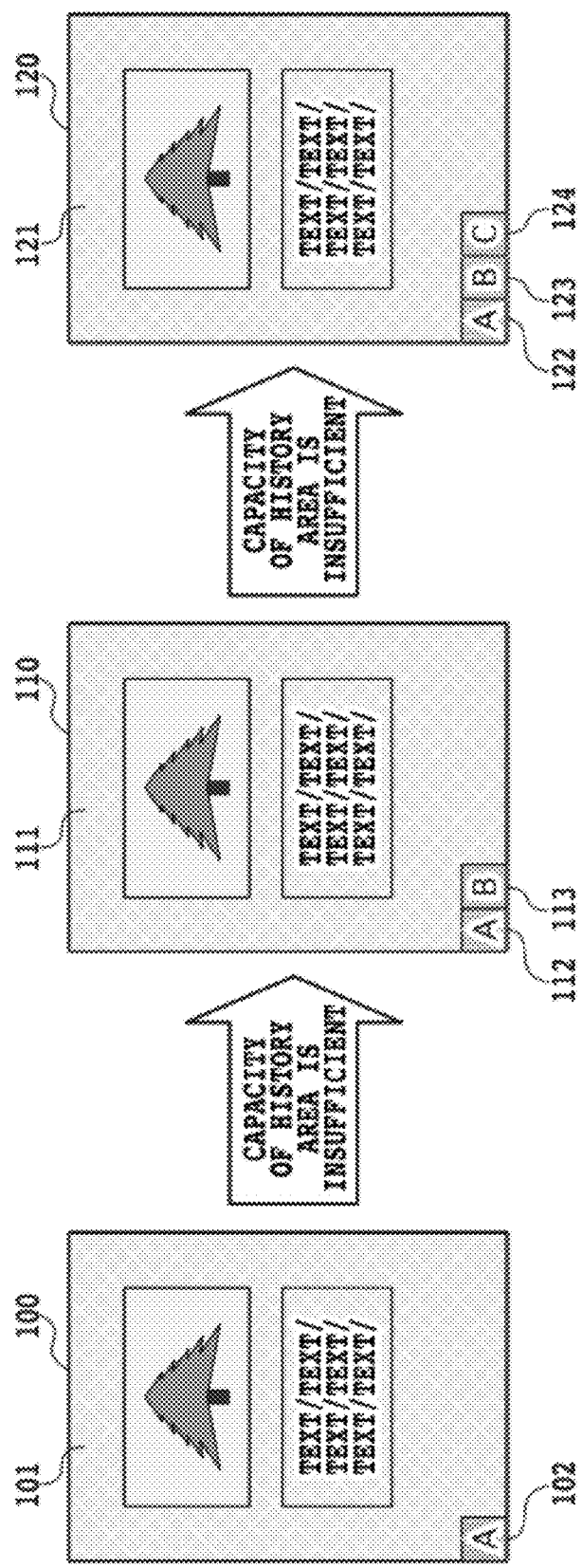
FIG. 14 is a diagram for explaining addition of an embedding area in the case where an information capacity of an area for embedding copy history information is insufficient in Embodiment 1.

Next, referring to FIG. 14, an adding method of an embedding area is described in the case where an information capacity of an embedding area for copy history information becomes insufficient.

FIG. 14 is a diagram for explaining the adding method of an embedding area in this embodiment, in the case where an information capacity of an embedding area for copy history information becomes insufficient.

In FIG. 14, a sheet of paper 100 has a background embedded information area 101 which is embedded into a background portion of an image, and a copy generation management area 102 prepared for embedding copy history information. In the area 101, contents set at the print security setting dialogue described using FIG. 3 are embedded, for example, in the form of LVBC described using FIG. 2. Further, in the area 102, for each copy, user name of one who copied, copy time, the machine number of the copy machine, and the like are embedded as the history information in the form of two-dimensional bar codes or of LVBC.

In the area 101, for example, coordinates information for identifying the position of the area 102 is also embedded, and as described above using FIG. 3, when the copy history information of the area 102 can not be extracted in the process of copy, the copy is discontinued.

Now, when copying the sheet of paper 100, the image forming device once deletes the copy generation management area 102, and newly codes information to which history information for this copy is added, and embeds again the coded information into the same area. However, since the information capacity for embedding is limited, the copy generation management area 102 runs out of its information capacity as the copy generations are repeatedly embedded. When the copy history information area is insufficient, the image forming device adds areas 112 and 113 in place of the copy generation management area 102 as indicated in 110 in order to manage subsequent generation information.

When copy generations are repeatedly embedded further and, consequently, the information capacity of the areas 112 and 113 becomes not sufficient, the matter can be handled by adding an area 124 as indicated in 120.

Meanwhile, a large copy history information area may be set from a first print, but when the area of an information extraction target other than background information is set large, it takes time to perform an information analysis process at the time of a copy, which is therefore not advantageous for achieving a fast copy process. In order to achieve a fast copy process, an embedding area for copy history information should be set as small as possible.

Meanwhile, as indicated in 110 and 120, when the copy history information area becomes plural areas, from information embedded in the portions 111 and 121, only the positions of 112 and 122 are identified, respectively. Accordingly, there is a need to detect the falsification even in the portion 113, 123, or 124.

Relationships between the respective embedding areas and the embedded information are described with reference to FIG. 15.

FIG. 15 is a table showing relationships between the respective embedding areas described in FIG. 14, and the embedded information.

For the embedding areas, there are, for example, areas 121, 122, 123, and 124 of FIG. 14, which are represented in a table of FIG. 15 as "background," "A," "B," and "C," respectively.

Figure 16:
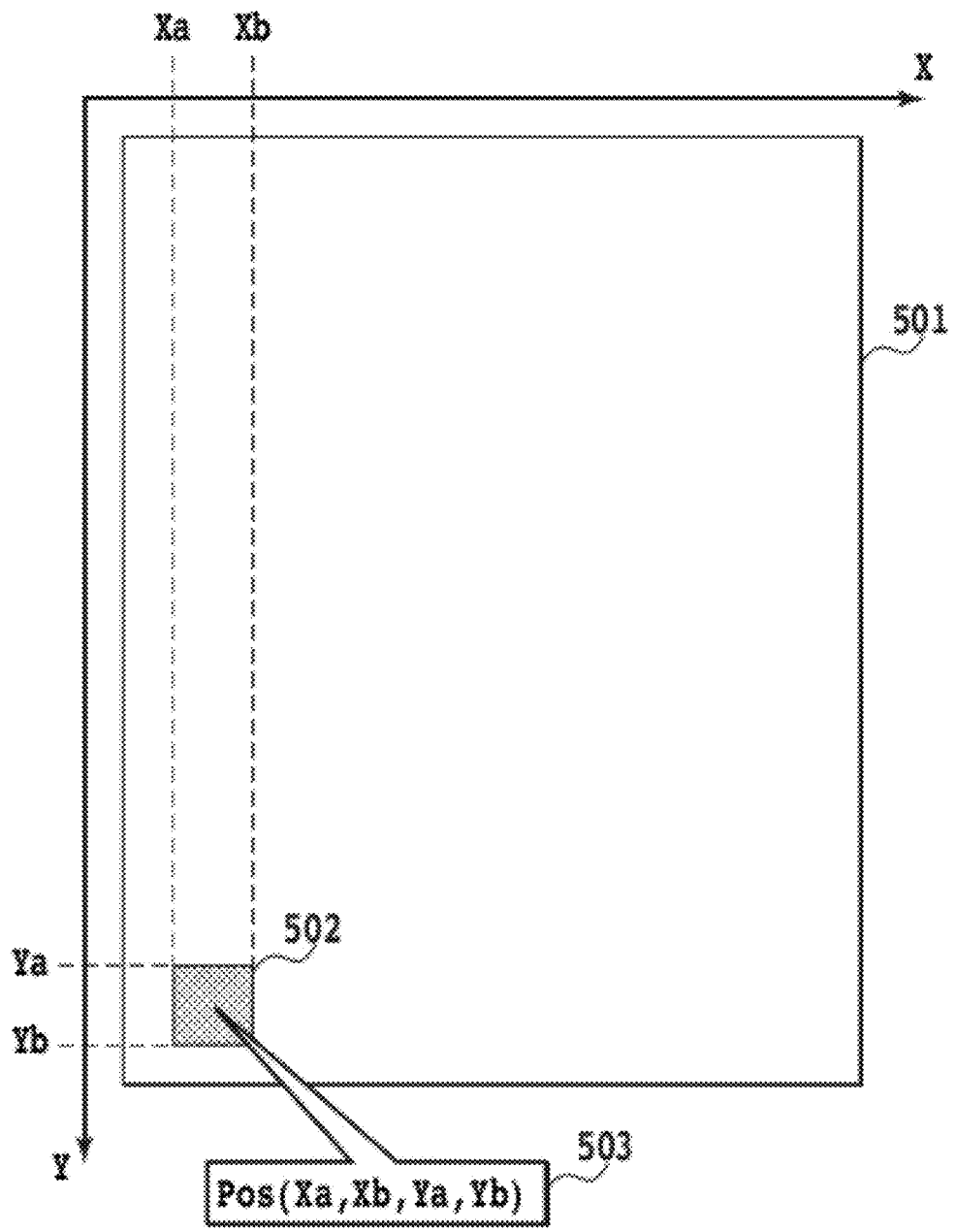
FIG. 16 is a diagram for explaining information identifying a position of an embedding area.

In the embedded information of "Background," there are copy inhibit information and tracking information at the time of the first print as described in FIG. 3. In addition, there is also information for identifying the embedding position of "A." For the information for identifying the embedding position, for example, as shown in FIG. 16, the coordinates information Pos (Xa, Xb, Ya, Yb) of an embedding area (rectangular area) may be used (this coordinates information is described later).

In the embedded information of "A," there is information for identifying the embedding position of "B" in addition to copy history information.

In the embedded information of "B," there is information for identifying the embedding position of "C" in addition to copy history information.

In the embedded information of "C," there is information "END" representing that "C" is the latest copy history information, in addition to copy history information.

As described above, in each area, link information (positional information of an area to be identified next) for accessing an area to be identified next is embedded so that, from the embedded information of "Background," all copy history information areas can be identified from the older generation. In this embodiment, it is determined that there is falsification, when all copy history information areas can not be identified from the older generation, and the copy operation is inhibited.

Information for identifying the position of an embedding area is described with reference to FIG. 16. FIG. 16 is a diagram for explaining information for identifying the position of an embedding area.

In FIG. 16, the position of an information embedding area 502 to an image area 501 is represented with coordinate values in X and Y directions relative to the entire image, e.g., represented as Pos (Xa, Xb, Ya, Yb) in 503.

By embedding coordinates information for identifying such an embedding position as different embedded information, link relationships can be given between plural pieces of embedded information. As a result, it becomes possible to track all pieces of embedded information from the embedded information of "Background" to be recognized first.

Next, information to be embedded into the embedding area 502 is described with reference to FIG. 17.

FIG. 17 is a table for explaining information which is embedded into the embedding area 502 described using FIG. 16.

In FIG. 17, for information to be embedded into the embedding area 502, first, there are "Total data size," "use size," and "number of managed histories." "Total data size" represents a maximum information capacity which can be embedded into an embedding area. "Use size" represents an information capacity, to "Total data size," which is actually usable for embedding information. "Number of managed histories" represents the number of pieces of copy history information being managed in a corresponding embedding area and, by storing copy history information, the number of pieces of copy history information increases for each copy. When there is an empty space in the information capacity of an embedding area, copy history information can be stored in the same embedding area.

Further, pieces of copy history information each constituted of "user," "time," and "machine number" are embedded in the embedding area 502, the number of pieces corresponding to "number of managed histories" (="N" in this example). The pieces of history information is embedded from "history 1," "history 2," up to "history N." These pieces of copy history information increase for each copy in accordance with "number of managed histories." In the embedding area 502, "link information" is also embedded. In "link information," stored is the positional information (e.g., coordinate values in the form given in 503: Pos (Xa, Xb, Ya, Yb)) of different embedding area newly added when the information capacity of the corresponding area is used up and the copy history information can not be further stored. This is used to identify an area in which the next copy history information is embedded from the present embedding area. Incidentally, until the information capacity of the present embedding area is used up, "END" is stored as link information. "END" represents an area for the latest copy history information, and hence represents there is no area to be accessed.

A determination process procedure of copy inhibit/copy permission is described with reference to FIG. 18.

Figure 18:
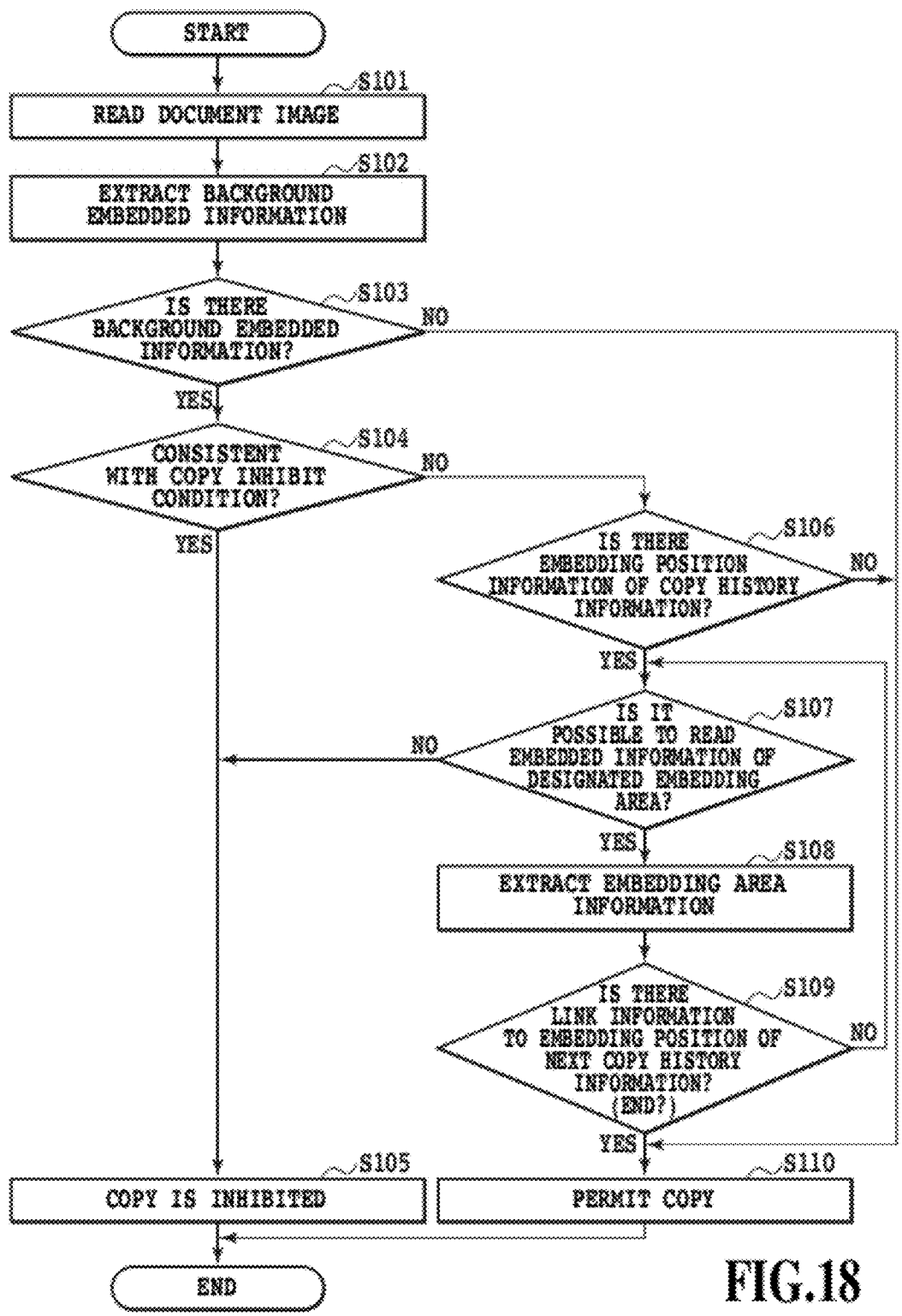
FIG. 18 is a flowchart for explaining a determination process procedure of copy inhibit/permission in the embodiment.

FIG. 18 is a flowchart for explaining a determination process procedure of copy inhibit/copy permission in this embodiment.

In this copy condition determination process, first, a document image is read (S101), and background embedded information is extracted (S102).

Based on an extraction result in Step S102, it is determined whether there is background embedded information in the document (S103). At this time, when there is background embedded information in the document, it is determined whether a copy inhibit condition included in the embedded information is satisfied (S104).

Meanwhile, in the determination of Step S103, when there is no background embedded information in the document, copy is permitted (S110) and a sequence of processes is terminated.

In the determination of Step S104, when it is determined that the copy inhibit condition is satisfied, copy is inhibited (S105), and the process is terminated.

Meanwhile, in the determination of Step S104, when it is determined that the copy inhibit condition is not satisfied, it is further determined (S106) whether there is embedding position information of copy history information in the background embedded information.

In the determination of Step S106, when it is determined that there is embedding position information of copy history information in the background embedded information, this embedding position information is set as designated positional information, and the process moves to S107. Meanwhile, when there is no embedding position information of copy history information in the background embedded information, the process moves to Step S110, and copy is permitted (S110).

In the above Step S107, it is determined whether embedded information can be extracted from an area being set by the designated positional information. When the embedded information can not be extracted, the process moves to S105, and copy is inhibited (S105).

Meanwhile, in the determination of the above S107, when it is determined that the embedded information of the designated embedding area can be extracted, copy history information and link information are further extracted from the embedded information (S108). As described above, the link information is any one of positional information of different embedded information and "END" information.

Next, in Step S109, when a content of the link information extracted in the above Step S108 is "END," it is determined that all the pieces of copy history information have been extracted, and finally copy is permitted (S110).

Meanwhile, in Step S109, when the content of the link information extracted in the above Step S108 is not "END" (i.e., positional information of different embedding area), the processes from Step S107 are repeated to an embedding area to be accessed next. That is, the positional information of an embedding area included in link information is set as designated positional information, and the process returns to S107.

In the above-described manner, the determination processes on copy inhibit/permission are performed.

Next, a copy history information embedding process procedure in this embodiment is described with reference to FIG. 19.

Figure 19:
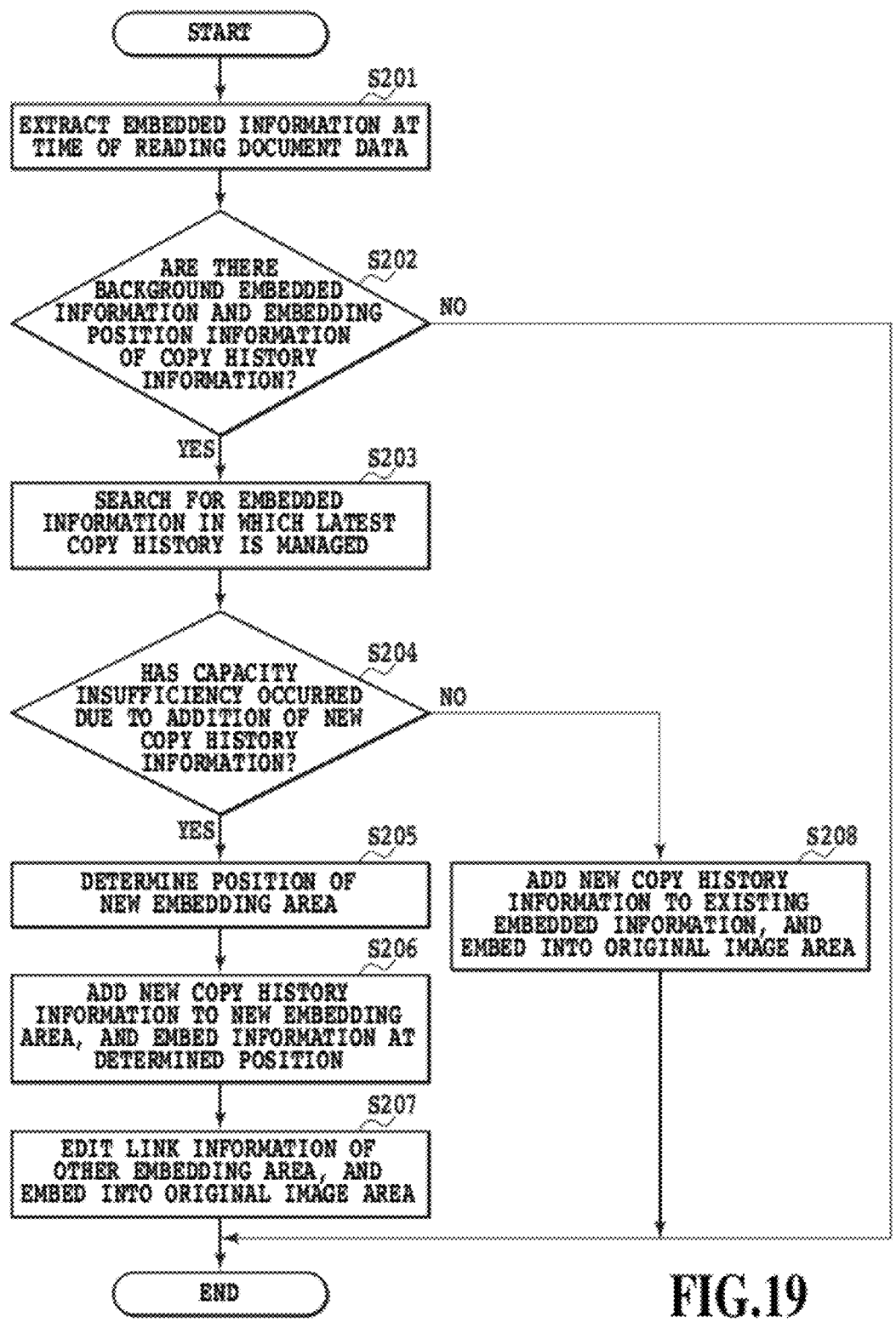
FIG. 19 is a flowchart for explaining a copy history information embedding process procedure in the embodiment.

FIG. 19 is a flowchart for explaining the copy history information embedding process procedure in this embodiment. Incidentally, processes of FIG. 19 are performed when copy is permitted after the determination process of copy inhibit/permission in FIG. 18.

In this process, background embedded information is extracted (S201) from document image data at the time of reading a document (Step S101 of FIG. 18). Further, it is determined (S202) whether there is background embedded information, and whether there is embedding position information of copy history information in this embedded information.

In the determination of Step S202, when it is determined that there is no background embedded information, or even when there is background embedded information and when it is determined that there is no embedding position information of copy history information in this embedded information, a sequence of processes is terminated.

Meanwhile, in the determination of Step S202, when it is determined that there is background embedded information and that there is the embedding position information of copy history information in this embedded information, the following process is performed. That is, from the background embedded information extracted in Step S201, an embedding area of the copy history information is identified in accordance with the embedding position information of the copy history information included in the embedded information. Thereafter, in accordance with a content of link information acquired from the embedded information, the embedding area is searched (S203) until the link information comes to indicate "END."

As described above, an embedding area with a content of the link information being "END" is an area for which the latest copy history is managed. An embedding process of copy history information occurs when copying is instructed by a user, and it is determined (S204) whether the information capacity of the area for which the latest copy history is managed becomes used up by embedding the history information of this copying.

In the determination of Step S204, when it is determined that the information capacity of the area will not be used up, the copy history information is newly embedded into the area managing the latest copy history (S208), in a manner that the history information of the corresponding copy is added thereto, and a sequence of processes is terminated.

Meanwhile, in the determination of Step S204, when it is determined that the information capacity of the area will become short, an embedding position for a new embedding area is determined (S205). In a new embedding area thus determined, copy history information of the corresponding copy is embedded (S206) in accordance with the data form of FIG. 17. As described above, link information included in the new embedding area is "END" (third information). Meanwhile, in an area in which a content of the link information has so far been "END" (additional information indicating that the embedding of additional information has been terminated), positional information of the newly added embedding area is newly embedded as link information, and the copy history information embedding process is terminated.

In the above-described manner, the copy history information embedding process is performed.

Figure 20:
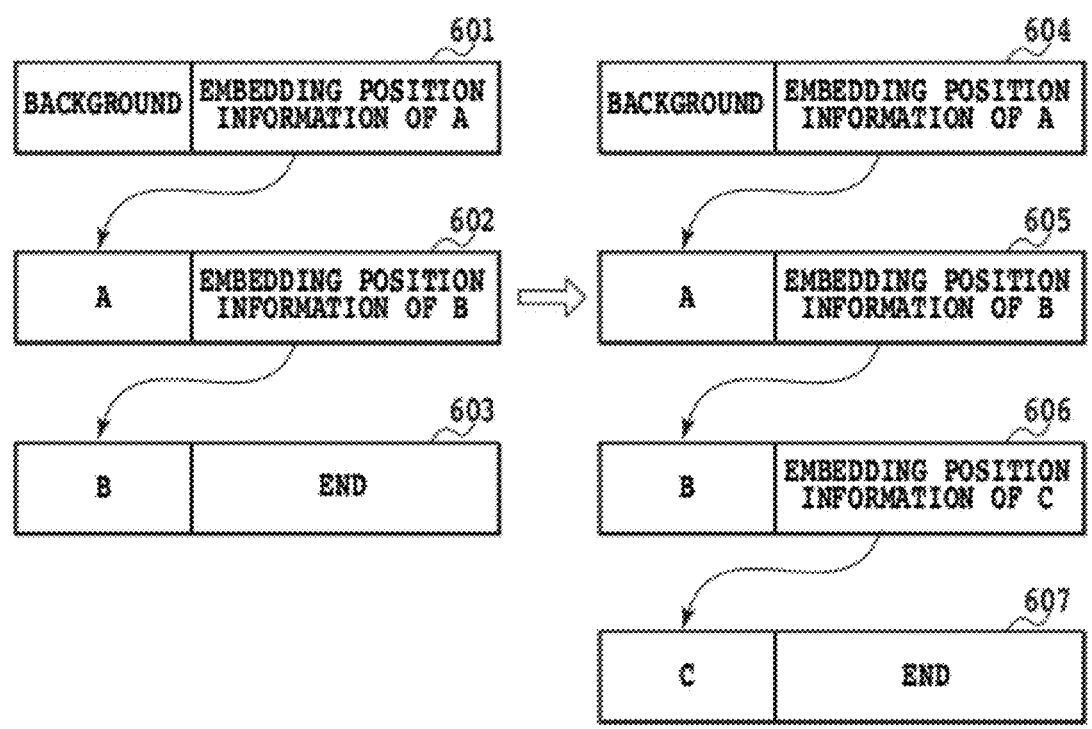
FIG. 20 is a diagram for explaining an example in the case where a copy history information embedding area is added.

Next, a description is given to the case where a copy history information embedding area is added by referring to FIG. 20. FIG. 20 is a diagram for explaining an example of the case where the copy history information embedding area is added.

In FIG. 20, relationships between embedding areas before copying are shown on the left side. Reference numeral 601 represents a background embedding area, in which embedding position information of an embedding area "A" 602 is managed. Reference numeral 602 represents an embedding area in which copy history information is managed, and in the embedding area, embedding position information of an embedding area "B" 603 is managed. Reference numeral 603 represents an embedding area in which copy history information is managed, and in the embedding area, "END" is embedded, the "END" representing that there is no embedded position to be subsequently linked.

When a copy history information embedding area indicated by 607 is added from this state, link information of the embedding area 606 is replaced from "END" to embedding position information that identifies position of an embedding area "C" 607. Further, in link information of the added embedding area "C" 607, "END" is embedded, the "END" representing that there is no embedded position to be subsequently linked. Note that, when the embedding area is added and the embedding area becomes plural, the embedding of information may be performed in order which is different (e.g., area "A"→area "C"→area "B") from the original order of embedding areas (e.g., area "A"→area "B"→area "C").

Even when there are plural embedding areas for copy history information, all embedding areas for copy history information can be identified at the time of copying by embedding therewith link information for tracking each embedding position thereof. Accordingly, it is determined that there is a falsification when all the pieces of copy history information are not extracted in order of copy generation. Thus, falsification of copy history information can be detected, and it is possible to achieve an increase of the embedded information capacity while maintaining security in the copy generation management using paper.

Meanwhile, link information for tracking the position of each embedding area is not necessarily positional information indicating the position of a subsequently added area. For example, when the position of an area to be embedded with additional information, and the order of embedding are defined in advance, an area to be subsequently added is determined without embedding link information including positional information. Accordingly, even when there is no specific positional information, when information which indicates the presence of added additional information is embedded as link information, additional information can be read in order from respective areas.

In the above embodiment, both the information of "END" (additional information indicating the end of the embedding of additional information), and additional information (may represent specific positional information) indicating the presence of added additional information are used, but any one of them may used.

That is, when only the information "END" (additional information indicating the end of the embedding of additional information) is used and when the information "END" is present, the reading of embedded additional information may be set up to an area in which this information "END" is embedded. In contrast, for an area in which the information "END" is not present, it may be determined that an area in which added additional information is embedded is present. Therefore, even when there is no information indicating the presence of added additional information, it is possible to track embedding areas only from the presence of the information "END" (additional information indicating the end of the embedding of additional information).

On the contrary, in the case where only information indicating the presence of added additional information is used, when this information is not present in an embedding area, it may be determined that there is no area in which added additional information is embedded, and it is determined that the reading of additional information is terminated at this area. In contrast, when this information is present in an embedding area, it may be determined that an area in which added additional information is embedded is present, and, even when the information "END" is not present, it is possible to track embedding areas only from the presence of the added additional information.

Embodiment 2

Next, a second embodiment of the present invention is described. In the configuration of the above Embodiment 1, the method of adding an embedding area in the case where an information capacity of an embedding area for copy history information becomes insufficient is as follows. Copy history information areas are accessed in order of copy generation from oldest. However, in this embodiment, another method is provided.

The method is described in detail below with reference to FIGS. 21 and 22.

Figure 21:
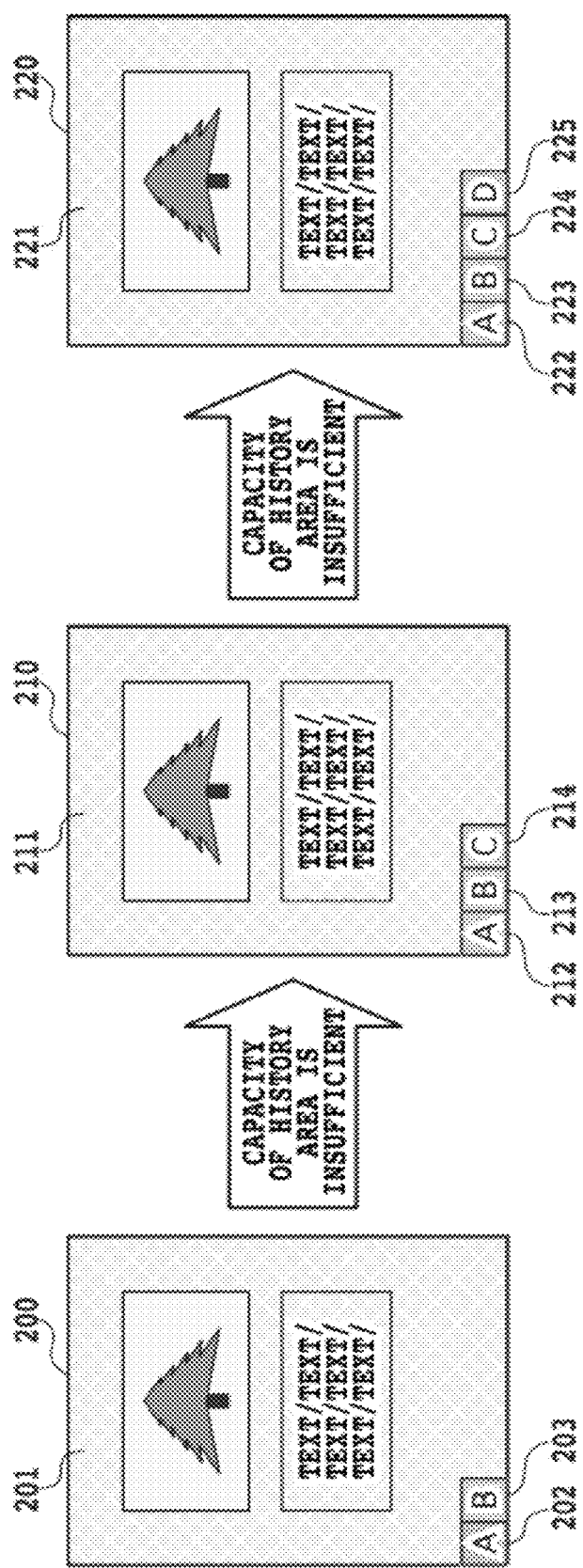
FIG. 21 is a diagram for explaining an adding method of an embedding area in the case where an information capacity of a copy history information embedding area is insufficient in Embodiment 2.

FIG. 21 shows relationships between respective embedding areas, the relationships being the same as those of FIG. 14, and also shows addition results in the case where an information capacity of a copy history information embedding area becomes insufficient.

Further, FIG. 22 is a table showing relationships between embedding areas described in FIG. 21 and embedded information.

For the embedding areas, for example, there are those indicated by 221 to 225 of FIG. 21, which are respectively represented in Table of FIG. 22 as "Background," "A," "B," "C," and "D."

In the embedded information for "Background," there are copy inhibit information and tracking information at the time of a first print as described in FIG. 3. In addition, there is also information for identifying the embedding position of "A."

The embedding area "A" is provided not for recording copy history information, but for managing the positions of other copy history information areas. Accordingly, copy history information is not included in the embedded information "A", and there are only pieces of positional information for identifying the positions of other embedding areas such as "B," "C," and "D."

Further, for respective pieces of embedded information for "B," "C," and "D," there are only pieces of copy history information which are in order of copy generation from oldest.

As described above, the position of the embedding area "A" managing link information for accessing each copy history information area is identified from the embedded information of "Background," and further, based on information embedded in the area "A", the positions of all the copy history information areas are identified. In this embodiment, also, as in Embodiment 1, it is determined that there is falsification, when not all the pieces of copy history information are extracted, and a copy operation is inhibited.

Embodiment 3

Next, Embodiment 3 of the present invention is described. In above-described Embodiments 1 and 2, in the adding methods of adding a copy history information embedding area, areas are added in sequence on positions determined by the system each having same area size, but this may be determined depending on documents.

Figure 23:
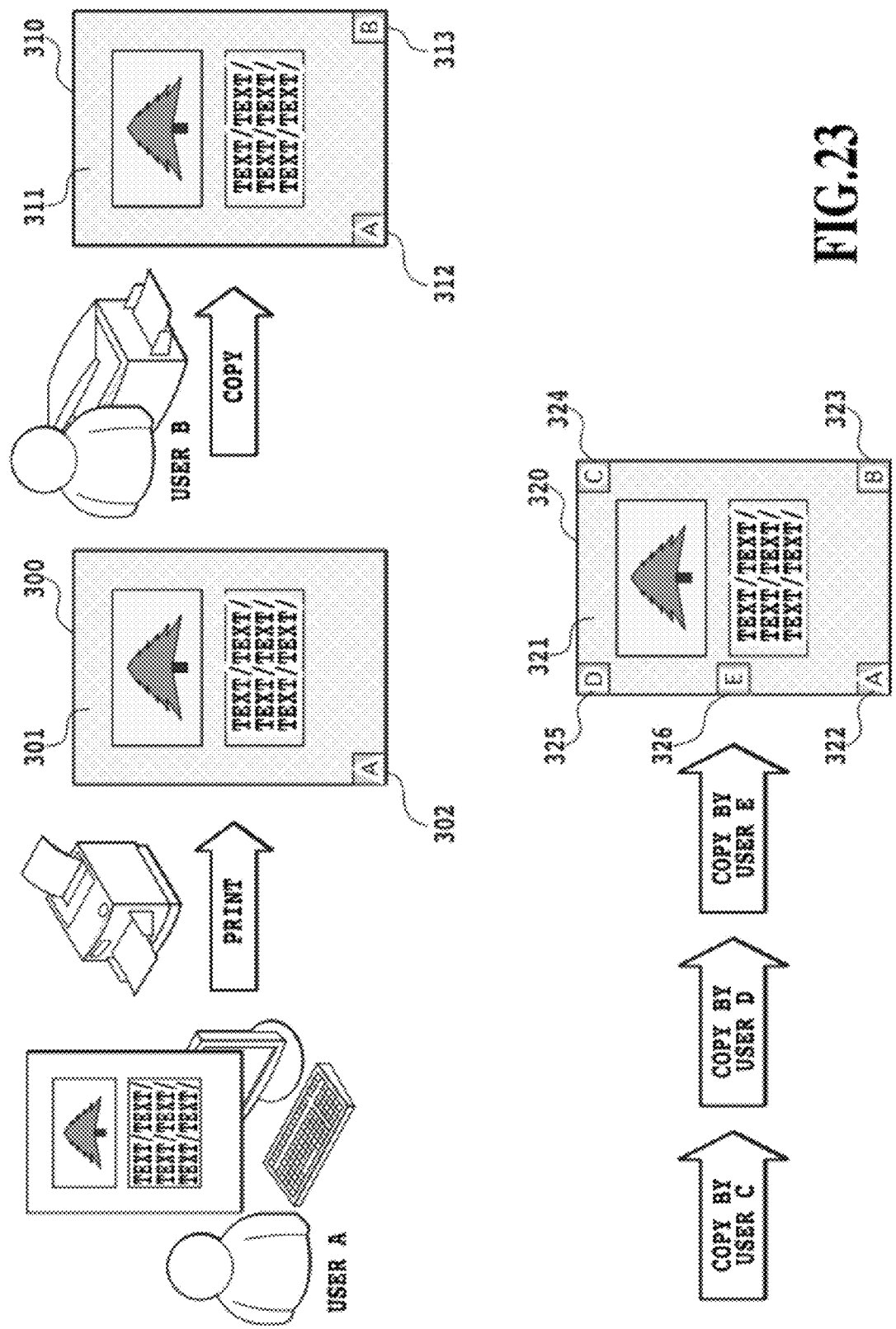
FIG. 23 is a diagram for explaining an adding method of a copy history information embedding area in Embodiment 3.

FIG. 23 is a diagram for explaining an adding method of adding a copy history information embedding area.

In FIG. 23, for each copy generation, a copy history information embedding area is added, but when adding an embedding area, the embedding position thereof is dynamically searched.

For that searching means, a means may be adopted in which candidate areas are determined in advance by the system, and an embedding position is adopted from the candidate areas by determining whether the a candidate area is a blank area at the time of copying a document. Alternatively, another means may be adopted in which an image separation on a document is performed by a known image separation means to determine a blank area, and an embedding area is determined based on the blank area.

Further, in Embodiments 1 and 2, a form is adopted in which a piece of embedded information includes pieces of history information of plural users. However, as shown in FIG. 23, a piece of copy history information may be embedded into an area which is provided for each user and is different from those for the other users. In an example on an upper side of FIG. 23, copy history information of user A is embedded into areas 302 and 312, and that of user B is embedded into area 313. Another example on a lower side of FIG. 23 is the same as the above.

As described above, a copy history information embedding area is added for each copy generation, and as in FIG. 17, by embedding information for identifying the positions of all the pieces of copy history information, falsification of copy history information is detected as in each of the embodiments described above.

Other Embodiment

An object of the present invention is also achieved in such a way that a computer of a system or of a device reads and executes a program code, the program code being stored in a storage medium and achieving a procedure indicated in the flowcharts or the data flows shown in the above embodiments. In this case, the program code itself read from the storage medium causes the computer to achieve the functions of the above embodiments. Therefore, this program code, and a computer readable storage medium in which this program code is stored/recorded also constitute part of the present invention.

For a storage medium providing the program code, for example, a floppy-disk (registered trademark), a hard disk, an optical disk, a magneto optical disk, a CD-ROM, a CD-R, a magnetic tape, a nonvolatile memory card, a ROM, or the like may be used.

Further, the functions of the above embodiments may be achieved in such way that a computer executes the read program. This executing of the program also includes the case where an OS or the like operating on the computer performs part of or all of actual processes based on an instruction of the program.

Further, the functions of the above embodiments may be achieved using an extension board inserted into a computer or an extension unit connected to a computer. In this case, first, the program read from the storage medium is written into the extension board inserted into the computer or into a memory of the extension unit connected to the computer. Thereafter, based on instructions of the program, a CPU or the like provided to the extension board or the extension unit performs part or all of actual processes. The functions of above embodiments are also achieved by the processing performed by such extension board or extension unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-16715, filed Jan. 28, 2008, which is hereby incorporated by reference herein in its entirety.

What is claimed is:

1. An image processing apparatus comprising:
an extracting unit which extracts copy history information from a code included in an image;
a generating unit which generates a new code by coding information including both new copy history information for a current copy and the extracted copy history information;

an identifying unit which identifies another code when the code included in the image includes link information to the other code; and an embedding unit which embeds the generated new code into the image, wherein the identifying unit does not identify the other code when the code included in the image does not include link information to the other code.

2. The image processing apparatus according to the claim 1, wherein the image from which the copy history information is extracted is a scanned image, and the image obtained by the embedding is the image to be printed.

3. The image processing apparatus according to the claim 1, wherein the embedding unit embeds the generated new code into the image in place of the code included in the image.

4. The image processing apparatus according to the claim 1, further comprising:

deleting unit which deletes the code included in the image from the image before the embedding unit embeds the generated new code into the image.

5. An image processing apparatus comprising:

an extracting unit which extracts copy history information from a code included in an image;

a generating unit which generates a new code by coding information including both new copy history information for a current copy and a part of the extracted copy history information;

an identifying unit which identifies another code when the code included in the image includes link information to the other code; and an embedding unit which embeds the generated new code into the image, wherein the identifying unit does not identify the other code when the code included in the image does not include link information to the other code.

6. The image processing apparatus according to the claim 5, wherein the image from which the copy history information is extracted is a scanned image, and the image obtained by the embedding is the image to be printed.

7. The image processing apparatus according to the claim 5, wherein the embedding unit embeds the generated new code into the image in place of the code included in the image.

8. The image processing apparatus according to the claim 5 further comprises:

deleting unit which deletes the code included in the image from the image before the embedding unit embeds the generated new code into the image.

9. An image processing method comprising:

an extracting step of extracting copy history information from a code included in an image;

a generating step of generating a new code by coding information including both new copy history information for a current copy and a part of the extracted copy history information;

an identifying step of identifying another code when the code included in the image includes link information to the other code; and an embedding step of embedding the generated new code into the image, wherein the identifying step does not identify the other code when the code included in the image does not include link information to the other code.

10. A program stored in a non-transitory computer-readable storage medium, the program causing a computer to execute the processes of:

an extracting step of extracting copy history information from a code included in an image;

a generating step of generating a new code by coding information including both new copy history information for a current copy and a part of the extracted copy history information;

an identifying step of identifying another code when the code included in the image includes link information to the other code; and an embedding step of embedding the generated new code into the image, wherein the identifying step does not identify the other code when the code included in the image does not include link information to the other code.

* * * * *